United States Patent
Norrga

(10) Patent No.: US 6,603,675 B1
(45) Date of Patent: Aug. 5, 2003

(54) APPARATUS AND A METHOD FOR VOLTAGE CONVERSION

(75) Inventor: Staffan Norrga, Stockholm (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/046,720

(22) Filed: Jan. 17, 2002

(51) Int. Cl.[7] .......................................... H02M 7/5387
(52) U.S. Cl. ...................................... 363/132; 363/137
(58) Field of Search ............................... 363/131, 132, 363/137

(56) References Cited

U.S. PATENT DOCUMENTS

| | | | | |
|---|---|---|---|---|
| 5,177,428 A | * | 1/1993 | Hirose et al. | 323/207 |
| 5,210,685 A | * | 5/1993 | Rosa | 363/109 |
| 5,872,707 A | * | 2/1999 | Asplund | 363/51 |
| 6,144,567 A | * | 11/2000 | Asplund et al. | 363/37 |
| 6,259,616 B1 | * | 7/2001 | Ekwall et al. | 363/132 |
| 6,519,169 B1 | * | 2/2003 | Asplund et al. | 363/132 |

* cited by examiner

Primary Examiner—Adolf Deneke Berhane
(74) Attorney, Agent, or Firm—Dykema Gossett PLLC

(57) ABSTRACT

An apparatus for converting direct voltage into three-phase alternating voltage and conversely comprises a VSC-converter (8) having a direct voltage intermediate link (9) and at least one phase leg (12, 13). Each current valve (14–17) of the phase legs has at least one semiconductor device of turn-off type and a rectifying member connected in anti-parallel therewith. A transformer (19) has two opposite ends of a first winding (20) thereof connected to an output (21, 22) each of the VSC-converter and a second winding (23) connected to a direct converter having at least three phase legs. Each of the current valves of the direct converter being able to conduct current and block voltage in both directions and to turn on by gate control. The midpoints (27, 27', 27") of the phase legs of the direct converters are provided with phase outputs for forming a terminal for the alternating phase voltage between these phase outputs.

63 Claims, 24 Drawing Sheets

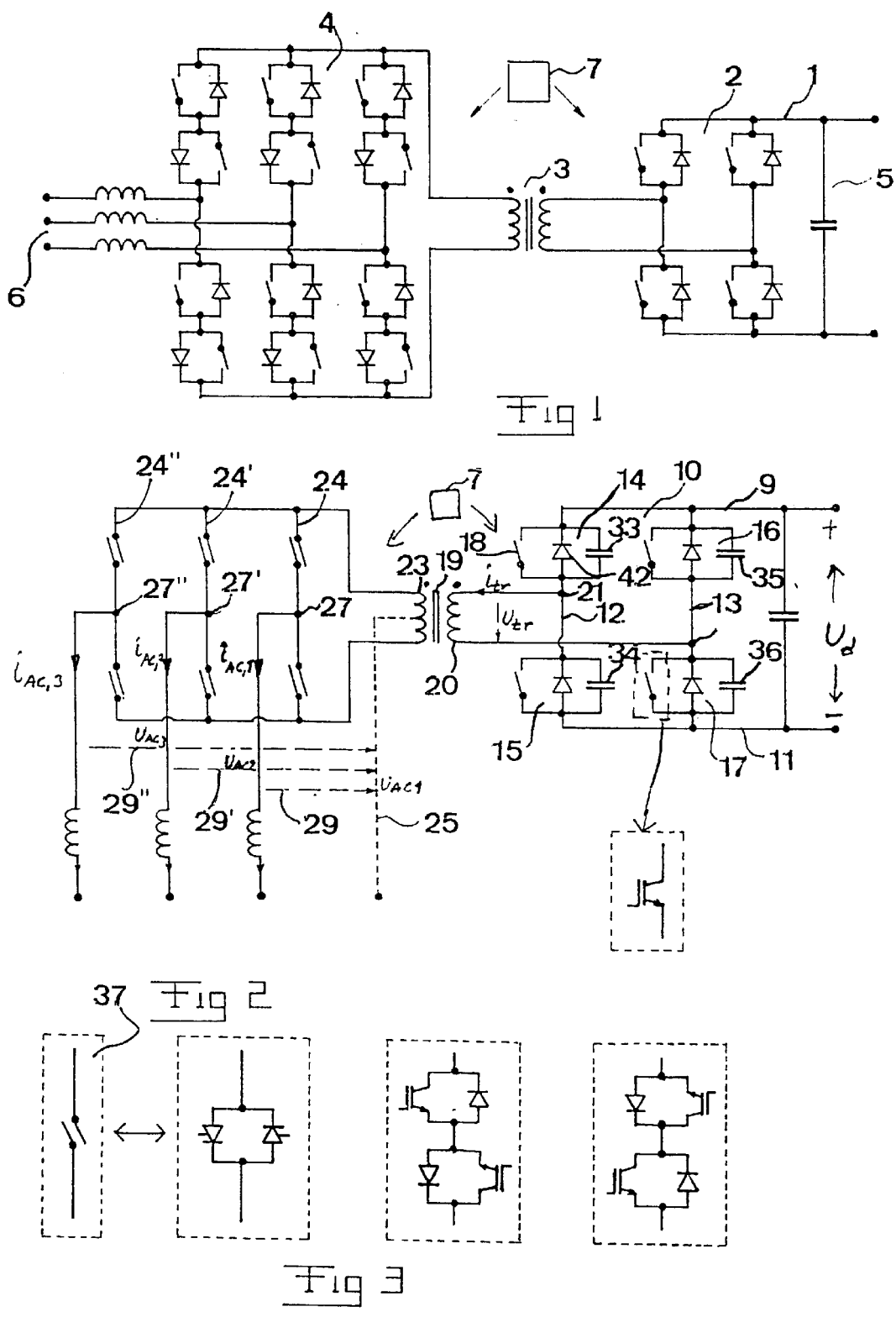

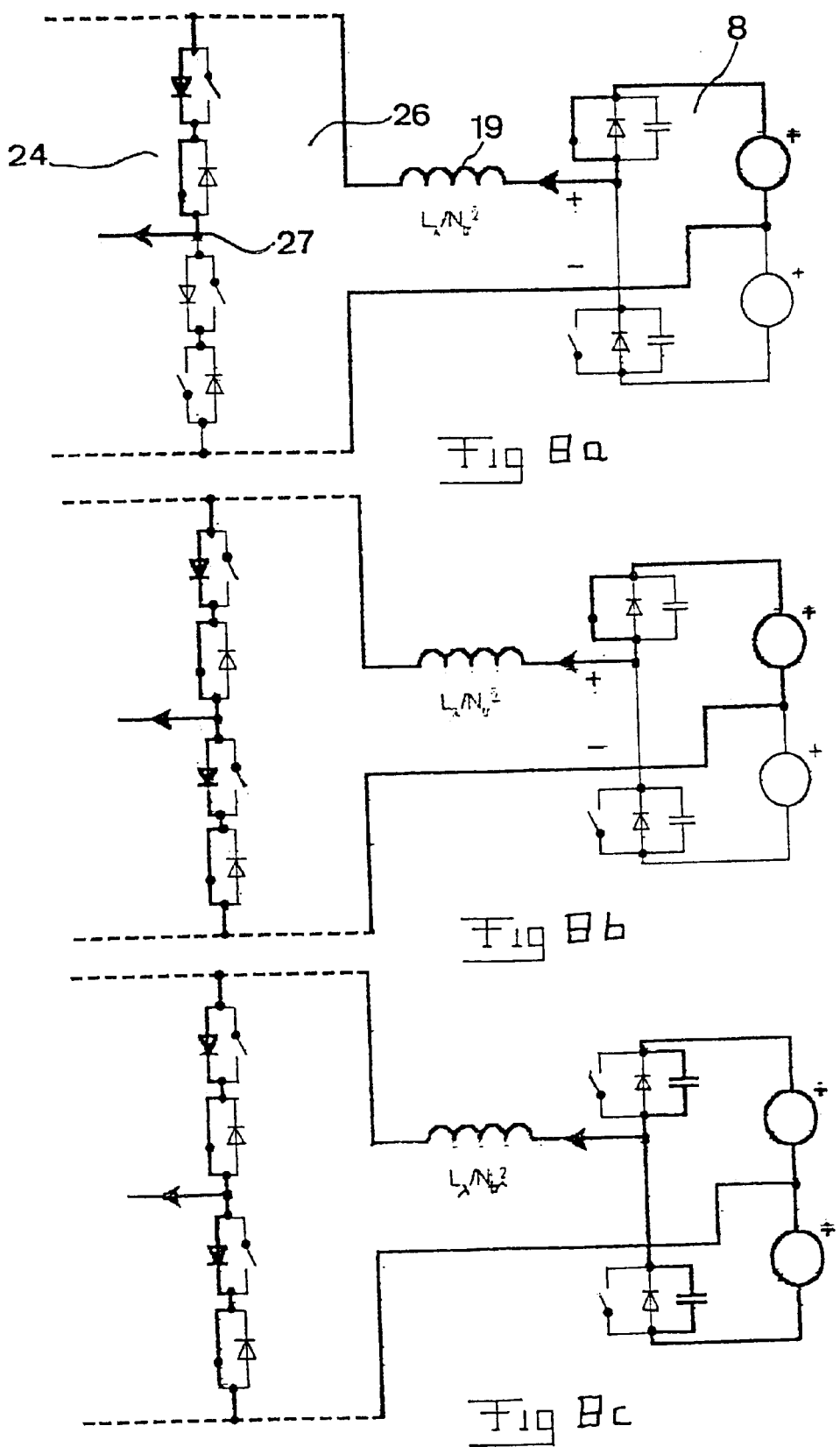

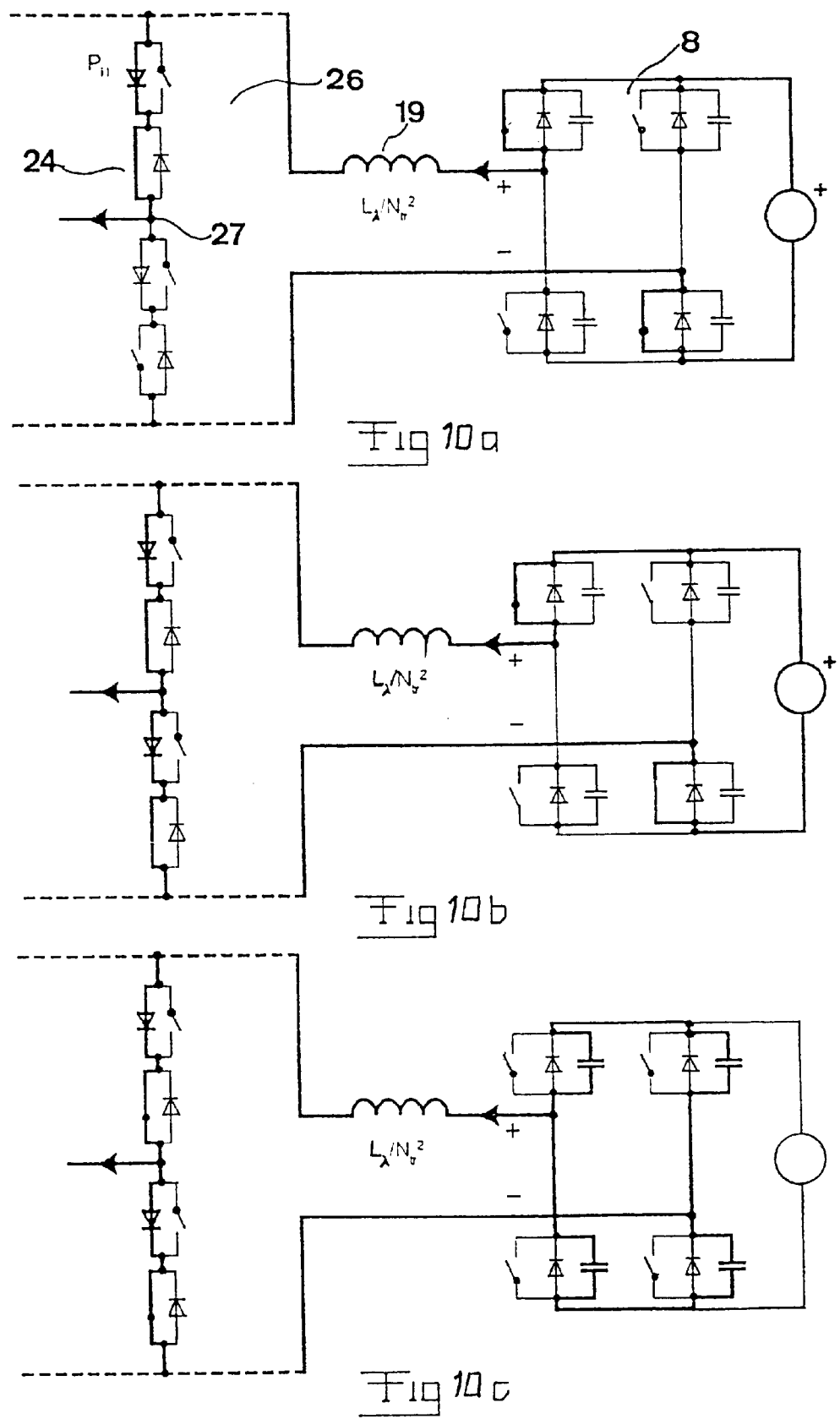

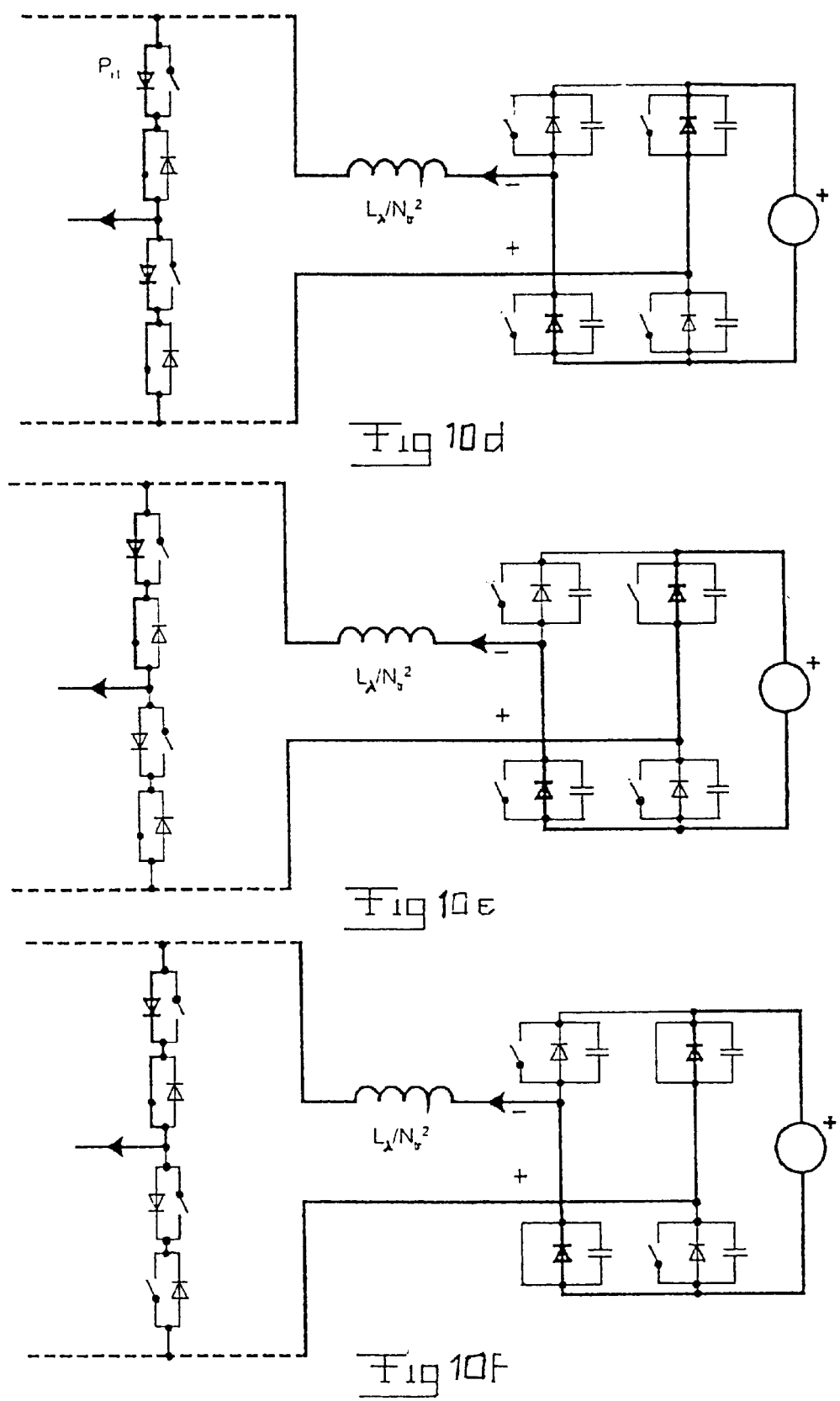

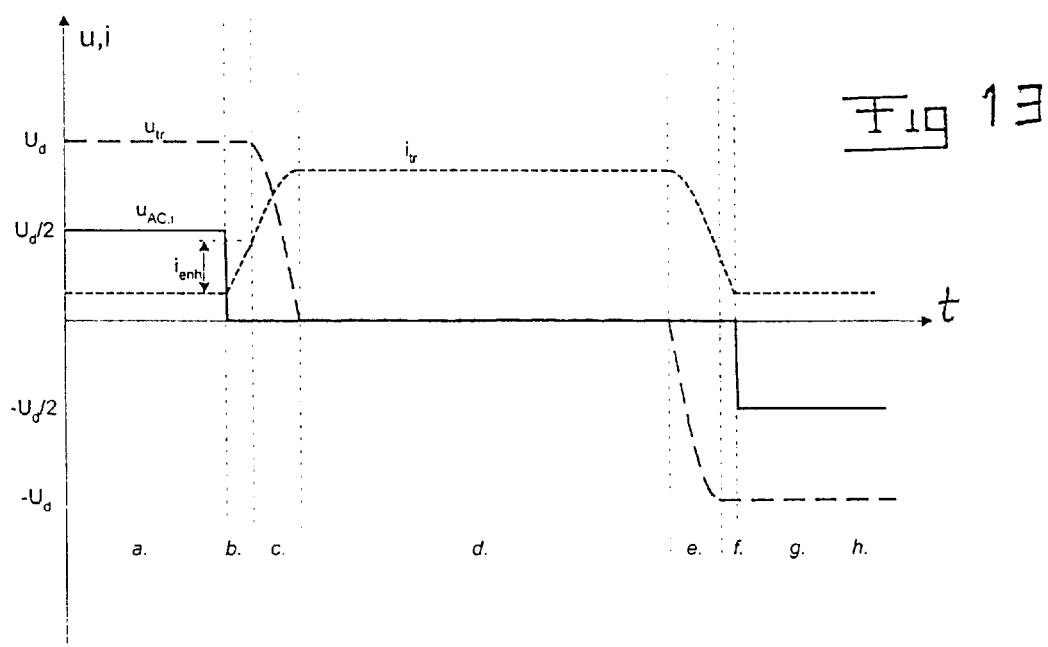

APPARATUS AND A METHOD FOR VOLTAGE CONVERSION

FIELD OF THE INVENTION AND PRIOR ART

The present invention is occupied with the problem to convert direct voltage into three-phase alternating voltage and conversely in all types of applications, such as in plants for transmission of electric power and for connecting three-phase electric machines to DC voltage loads and sources. Any ranges of voltages, currents and powers are conceivable.

The invention relates more particularly to such an apparatus comprising a VSC-converter (VSC=Voltage Source Converter) having a direct voltage intermediate link with a positive and a negative pole and at least one phase leg interconnecting the two poles and having at least two current valves connected in series, each current valve having at least one semiconductor device of turn-off type and a rectifying member connected in antiparallel therewith, the apparatus further comprising a transformer with two opposite ends of a first winding thereof connected to an output each of the VSC-converter and with a second winding thereof connected to an arrangement adapted to form voltage pulses for forming an alternating phase voltage, the apparatus also comprising a unit adapted to control the VSC-converter and said arrangement for obtaining said voltage conversion, and a method for converting direct voltage into alternating voltage and conversely according to the preamble of the appended independent method claim.

It is pointed out that "first winding" and "second winding" are to be interpreted as a primary and a secondary winding of a transformer used for voltage transformation, although it is here not indicated which one is which.

"Rectifying member" is here and in the entire disclosure, including the appended claims, to be interpreted broadly, and it may be any member with ability to take a voltage and block current in at least one direction therethrough, and it does not have to be a diode, but it could for example also be controllable, such as a thyristor (see for example FIG. 3 of this disclosure). Furthermore, the rectifying member and the semiconductor device may also be integrated in one single semiconductor device or switching device. This means for the VSC-converter a semiconductor device with reverse conducting property, such as a MOSFET with an inherent "body diode".

An apparatus of this type may be used for converting direct voltage into alternating voltage and conversely in applications where it is important to obtain a galvanic isolation between the direct voltage side and the alternating voltage side. Furthermore, it is possible to obtain a voltage with variable frequency and amplitude on the alternating voltage side, a bilateral power flow and voltage as well as current transformation by an apparatus of this type.

A known such apparatus comprises a transformer that operates at the alternating voltage side frequency, which generally means a low frequency and thereby a heavy and bulky transformer. This results in a considerably lower efficiency of the transformer and thereby of the apparatus than would the transformer be able to operate at higher frequencies.

An apparatus of this type enabling operation of the transformer at higher frequencies than the alternating voltage frequency is known through "Power loss reduction techniques for three-phase high frequency link DC-AC converter" 24$^{th}$ Annual IEEE Power Electronics Specialists Conference, PESC '93 Record. pp. 663–668, 1993 by I. Yamato and N. Tokunaga, and through "High-frequency link DC/AC converter with suppressed voltage clamp circuits-naturally commutated phase angle control with self turnoff devices", IEEE Transactions on Industry Applications, vol. 32, No. 2, pp. 293–300, March-April 1996 by M. Matsui, M. Nagai, M. Mochizuki and A. Nabae, the latter being shown in the appended FIG. 1. The reference numerals used there are as follows: direct voltage intermediate link 1, voltage source converter 2, transformer 3, arrangement 4, direct voltage side 5 and alternating voltage side 6. The arrangement on the alternating voltage side of the transformer is here a cycloconverter operating with natural commutation and converting the high frequency alternating voltage from the voltage source converter into an alternating voltage of the desired frequency. However, the voltage source converter still operates with forced commutation and hard switching resulting in comparatively high stresses on the semiconductor devices of the current valves resulting in comparatively high switching losses. Furthermore, the current valves of the voltage source converter are in the apparatus according to the latter reference controlled by a control unit 7 according to a method resulting in square voltage pulses with no zero-voltage interval thereby indirectly increasing the content of harmonics in the alternating voltage side output voltage. Besides the fact that the power lost in the form of heat results in considerable costs the semiconductor devices of the current valves have to either be dimensioned to be able to withstand high thermal stresses and thereby be costly or a lower frequency of the VSC-converter has to be applied resulting in a more bulky transformer and a degraded curve shape for the alternating current curves.

It is also known to utilize so called soft switching for reducing switching losses in apparatuses for converting direct voltage into alternating voltage and conversely, and these concepts generally incorporate additional semiconductor devices that do not take part in the power conversion itself. These additional (auxiliary) semiconductor devices and the control circuitry associated therewith add to the costs and complexity of such an apparatus. Moreover, they often involve a derating of the main semiconductor devices in the current valves either in terms of the maximum current or voltage.

SUMMARY OF THE INVENTION

The object of the present invention is to provide an apparatus of the type defined in the introduction having improved properties with respect to such apparatuses already known.

This object is according to the invention obtained by providing such an apparatus, in which the VSC-converter comprises at least one snubber capacitor connected to said current valves thereof, in which said arrangement comprises a direct converter having at least three phase legs connected through the opposite ends thereof to opposite ends of said second winding of the transformer and having at least two current valves connected in series, each of these current valves being able to conduct current and block voltage in both directions and to turn on by gate control, and in which the midpoints of said phase legs of the direct converter are provided with phase outputs for forming a terminal for said alternating phase voltage between these phase outputs.

The use of at least one such snubber capacitor in an apparatus of this type including a VSC-converter, a transformer and a direct converter results in a possibility to obtain soft switching of the semiconductor devices in the VSC-converter. This capacitor/these capacitors will be used as energy storing means and be discharged and recharged when changing the switching state of the VSC-converter remarkably reducing the voltage derivatives when the valves are switched and the direct converter commutating the current gives rise to further advantages with respect to switching losses and stresses for the semiconductor devices and rectifying members, and the former may also be turned on at zero-voltage and low current derivatives. The rectifying members, e.g. diodes, may be turned on at low voltage derivatives and turned off at zero-voltage and at low current derivatives. In the direct converter no hard turn-off capability is needed, but the valves may very well turn off at a current zero-crossing similar to the turn-off process in a conventional thyristor converter. Accordingly, the losses may be reduced in an apparatus of this type with respect to such apparatuses already known and thereby costs be saved. Less costly semiconductor devices may also be used thanks to the reduced thermal stresses thereon. The basic functionality of an apparatus of this type in the form of voltage conversion with variable frequency on the alternating voltage side, the bilateral power flow, galvanic isolation by a magnetic transformer and voltage and current transformation may of course still be obtained. Furthermore, this design of the apparatus enables a variety of different control regimes for adapting the operation of the apparatus to the conditions prevailing. The basic principle of the operation of the apparatus is that the switching state of the VSC-converter determines the sign of the voltage across the transformer and the switching state of the direct converter determines the direction of the current through the transformer. Fundamentally, it is necessary to commutate the VSC-converter, i.e. changing the sign of the transformer voltage, for being able to commutate the direct converter, which is necessary for being able to commutate the VSC-converter again and so on. The VSC-converter also has to be commutated on a regular basis for limiting the transformer flux, whereas the direct converter is modulated for obtaining an alternating voltage pulse pattern on said terminal. "Direct converter" is here defined as a converter having no energy storing means, such as a direct voltage intermediate link.

According to a preferred embodiment of the invention said current valves of the VSC-converter each comprises a said snubber capacitor connected in parallel with said semiconductor device and rectifying member. An alternative to provide the function of said at least one snubber capacitor is provided by the fact that according to another preferred embodiment the VSC-converter comprises one said snubber capacitor connected in parallel to said first transformer winding.

According to a preferred embodiment of the invention said VSC-converter has two said phase legs and said outputs connected to the ends of said first transformer winding are formed by a midpoint between current valves of a phase leg each, and according to another preferred embodiment of the invention the VSC-converter has one said phase leg, one of said outputs connected to the ends of said first transformer winding is formed by a midpoint between current valves of said phase leg, and the output connected to the opposite end of the first transformer winding is formed by a midpoint of the direct voltage intermediate link separated from both said positive and negative poles by at least one capacitor. The embodiment with a VSC-converter having two phase legs has the advantage of making it possible to obtain zero-voltage intervals across said first transformer winding. However, the embodiment with only one phase leg has the advantage of a smaller number of components with respect to the two-phase legs design.

According to a preferred embodiment of the invention, which has already been indicated above, the valves of the direct converter comprise a semiconductor device adapted to be turned off and thereby turn off the valve by zero-crossing of the current through the semiconductor devices resulting in soft switching properties.

According to another preferred embodiment of the invention the rectifying members of the valves of the direct converter are based on a material having a wide energy gap between the valence band and the conduction band, i.e. a band gap exceeding 2 eV, and are preferably of silicon carbide. Especially when the switching devices turn off at current zero-crossing the reverse recovery of the diodes may cause overvoltages across the valves and increased switching losses if traditional silicon diodes are used. However, this problem is solved by using diodes of such a material, especially of silicon carbide, which exhibit nearly ideal behaviour in terms of reverse recovery.

According to another preferred embodiment of the invention said control unit is adapted to control the semiconductor devices of the VSC-converter for changing the switching state of this converter, by changing the connection of at least one of said outputs thereof from one pole of said direct voltage intermediate link to the other while charging and discharging said snubber capacitor(-s) for lowering the voltage derivatives during turn-off of a semiconductor device. In an embodiment, in which the VSC-converter has two said phase legs, said control unit is adapted to commutate one phase leg of the VSC-converter at a time starting from a state in which the two midpoints are connected to different poles of the direct voltage intermediate link for obtaining an intermediate state in which said midpoints are connected to the same pole for applying a zero-voltage to the first winding of the transformer. Accordingly, this way of changing the switching state of the VSC-converter makes it possible to obtain zero-voltage intervals also at said alternating phase voltage terminal. Moreover, according to another preferred embodiment of the invention said control unit is adapted to varying in an appropriate fashion the order in which the phase legs of the VSC-converter are commutated, which results in a possibility to distribute the losses in the diodes and semiconductor switches equally over several switching cycles.

According to another preferred embodiment of the invention said control unit is adapted to control the semiconductor devices of the current valves of the VSC-converter for commutating both phase legs at the same time starting from the state in which the two midpoints are connected to different poles of the direct voltage intermediate link through a conducting semiconductor device each by turning these semiconductor devices of both said valves off. This control regime has the advantage of being somewhat simpler than the regime for commutating one phase leg at the time.

According to another preferred embodiment of the invention said control unit is adapted to commutate the phase legs of the direct converter when the power flow in the apparatus is directed from the alternating voltage side to the direct voltage side, i.e. from the direct converter to the VSC-converter, by controlling the current valves of those phase legs for changing the connection of the output thereof from one end of said second transformer winding to the other for changing the direction of the current through said second transformer winding enabling a change of the switching state of the VSC-converter. All phase legs of the direct converter have to be commutated in this way for changing the direction of the transformer current. A desired voltage pulse width modulation pattern may be achieved on the alternating phase voltage terminal by such a control.

According to another preferred embodiment of the invention constituting a further development of the embodiment just mentioned the control unit is, starting from a state in which the output of a phase leg of said direct converter is connected to a first end of the second transformer winding through a conducting first current valve, adapted to turn the other, second current valve of that phase leg on for short-circuiting the phase leg for opening a current path through the winding of the transformer in the direction of the voltage across the transformer, so that the second current valve gradually takes over the current through the transformer and the first current valve turns off by natural commutation as the current through it goes down to zero.

According to another preferred embodiment of the invention said control unit is adapted to control the conducting current valves of the phase legs of the VSC-converter to turn off for commutating the output of those phase legs and at the same time, starting from a state in which the output of a phase leg of the direct converter is connected to a first end of the second transformer winding through a conducting first current valve, control the other, second current valve of that phase leg to turn on for short-circuiting the second transformer winding through that phase leg for opening a current path through that winding of the transformer in the direction of the voltage across the transformer so as to form a resonance circuit by the capacitance of the snubber capacitor (-s) of the VSC-converter and the leakage inductance of the transformer making the current through said first transformer winding increasing for assisting the commutation of said phase legs of the VSC-converter by charging and discharging said snubber capacitor(-s). This embodiment takes care of a problem that may be severe under certain conditions, namely when the current on the alternating voltage side of the apparatus is low, since it may then be impossible to commutate the VSC-converter in the normal way. The current through the transformer may then be insufficient for recharging the snubber capacitor(-s) regardless of the switch state of the direct converter. The recharge of the snubber capacitors may take too long time or in the extreme case when $i_{AC,i}$=0, i=1, 2, 3 will not occur at all. By forming the resonance circuit in this way a resonance process governed by the snubber capacitances and the leakage inductance is initiated. Through this process the snubber capacitor(-s) are recharged so that the potential of the phase outputs of the phase legs of the VSC-converter swing to the opposite pole of the direct voltage intermediate link. This also means that the transformer voltage changes direction.

According to another preferred embodiment of the invention the apparatus comprises an additional inductor connected in series with said first transformer winding for increasing the inductance of said resonance circuit. This means that the time required for changing the switching state of the VSC-converter may be prolonged.

According to another preferred embodiment of the invention said control unit is adapted to a) control the semiconductor devices of the VSC-converter for changing the switching state of this converter by changing the connection of at least one of said outputs thereof from one pole of said direct voltage intermediate link to the other for changing the sign of the voltage across said first transformer winding and b) commutate the phase legs of the direct converter for changing the end of the second transformer winding to which the respective phase output is connected in such a sequence and at such delays that desired voltage pulses are obtained on said terminal and do this until the current through the second transformer winding has changed direction, and then start over with controlling the VSC-converter to change switching state again. This is a preferred generic commutation strategy to be used, in which it is assumed that the power initially flows from the direct voltage side to the alternating voltage side, and in the opposite case it is started by step b) followed by step a) and then by step b) again.

According to another preferred embodiment of the invention the control unit is adapted to control the semiconductor devices of the VSC-converter for changing the switching state thereof and start commutating one or several phase legs of the direct converter by controlling a current valve of that (those) phase leg(s) before the change of switching state of the VSC-converter has been completed, when there is a desire to avoid the state the system appears in after a commutation of the VSC-converter. By using such an interlaced commutation of the two converters an interval of each switching cycle during which the power flow will be of the opposite direction with regard to the desired direction may be reduced and the overall commutation speed can be increased. The apparatus has then preferably means for detecting the voltage across said first transformer winding, and the control unit is adapted to start the commutation of the direct converter based upon information from said voltage detecting means when, as a consequence of the change of switching state of the VSC-converter commenced, the voltage across the first transformer winding has changed sign and exceeded a predetermined threshold voltage value. It is thereby ensured that a complete commutation of both converters takes place, since it is for that necessary that the polarity of the transformer voltage is reversed and have reached a certain magnitude before the commutation of the direct converter is initiated.

According to another preferred embodiment of the invention, also relating to interlaced commutation, the control unit is adapted to commutate all phase legs of the direct converter by controlling the current valves of the phase legs and start controlling the semiconductor devices of the VSC-converter for changing the switching state thereof before the commutation of all phase legs of the direct converter has been completed, when there is a desire to avoid the state the system appears in after a commutation of all of the phase legs of the direct converter. When a power flow in that direction is desired it is also preferred to provide the apparatus with means for detecting the current through the second transformer winding, and the control unit is adapted to start the control of the VSC-converter for changing the switching state thereof based upon information from said current detecting means when, as a consequence of the commutation of the phase legs of the direct converter commenced, the current through the second transformer winding has changed direction and exceeded a predetermined threshold current value. A complete commutation of both converters is ensured when the direction of the transformer current has been reversed and reached a certain magnitude before the commutation of the VSC-converter is initiated.

The invention also relates to a method for converting direct voltage into alternating voltage and conversely according to the independent method claim. The advantages of such methods and of methods according to preferred embodiments of the invention defined in the dependent method claims appear without any doubt from the above discussion of the apparatus according to the preferred embodiments of the invention.

The invention also relates to a computer program product and a computer readable medium according to the corresponding appended claims. It is easily understood that the method according to the invention defined in the appended said method claims is well suited to be carried out through program instructions from a processor adapted to be influenced by a computer program provided with the program steps in question.

Further advantages as well as advantageous features of the invention appear from the following description and the other dependent claims.

BRIEF DESCRIPTION OF THE DRAWINGS

With reference to the appended drawings, below follows a specific description of preferred embodiments of the invention cited as examples:

In the drawings:

FIG. 1 is a circuit diagram schematically illustrating an apparatus according to the prior art, FIG. 2 is a circuit diagram illustrating an apparatus according to a first preferred embodiment of the invention, FIG. 3 illustrates schematically different options of designing a valve of the direct converter in an apparatus according to the invention, FIGS. 8a–f are circuit diagrams of an apparatus according to the invention having a VSC-converter with one phase leg in different states during a procedure for resonantly assisted commutation of said VSC-converter, FIG. 13 is a graph illustrating voltages and currents versus time for the procedure according to FIGS. 12a–h.

DETAILED DESCRIPTION OF PREFERRED EMBODIMENTS OF THE INVENTION

Figure 4A:
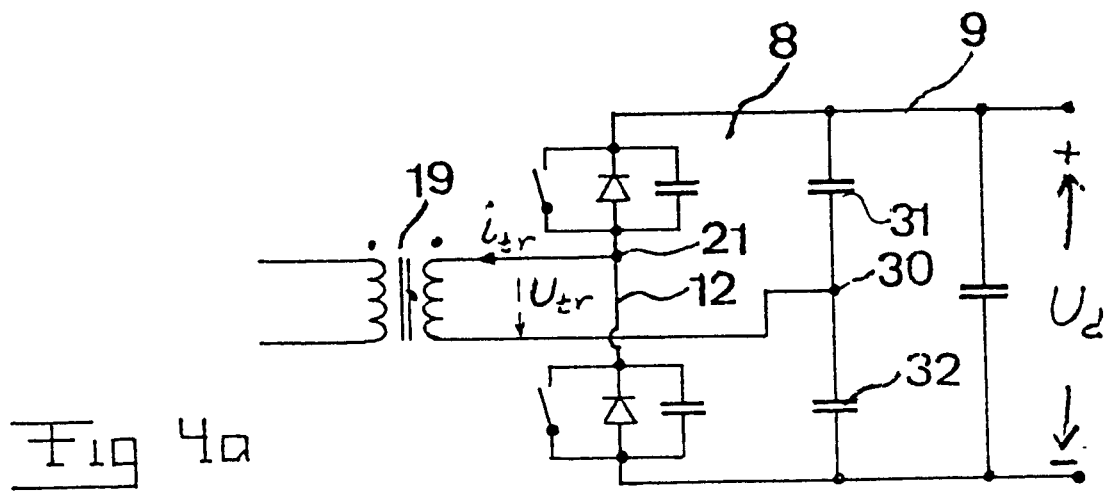
FIGS. 4a, 4b and 4c are circuit diagrams illustrating a part of an apparatus according to further preferred embodiments of the invention.

FIG. 2 illustrates an apparatus according to a preferred embodiment of the invention having a VSC-converter 8 with a direct voltage intermediate link 9 with a positive 10 and a negative 11 pole and two phase legs 12, 13 (1 and 2, respectively, in the formulas following) interconnecting the two poles and having two current valves 14–17 connected in series. Each current valve has one semiconductor device 18 of turn-off type, such as an IGBT, and a rectifying member 42, such as a rectifying diode, connected in anti-parallel therewith. A snubber capacitor 33–36 is connected in parallel with each said semiconductor device 18 and diode 42. A transformer 19 is with two opposite ends of a first winding 20 connected to an output 21, 22 each of the VSC-converter and with a second winding 23 (having a connection 25 to the midpoint thereof for grounding purposes) thereof with the opposite ends connected to the opposite ends of three phase legs 24, 24' and 24" (1, 2 and 3, respectively, in the formulas following) of a direct converter 26. The phase legs of the direct converter have each two current valves connected in series, which each has at least one semiconductor device and a rectifying member connected in anti-parallel therewith making it able to conduct current and block voltage in both directions and making it possible to control the valve to turn on. A midpoint 27, 27', 27" of each phase leg of the direct converter is provided with a phase output for forming a terminal 29, 29', 29" for an alternating phase voltage between the respective phase output and the connection 25. The alternating voltage side currents $i_{AC,i}$ are defined to be positive as shown here. The same is valid for the voltages $u_{AC,i}$.

It is pointed out that each current valve shown in the figures may be substituted by a plurality of current valves connected in series, which will then have the same function and be controlled in the same way as one single such current valve. When high voltages are to be handled it may be necessary to connect a plurality of current valves in series in that way, since the semiconductor device and the diode of each valve may not alone block a voltage being high enough with respect to the voltages to be handled by the apparatus.

FIG. 3 illustrates three possibilities of designing a current valve for the direct converter. The left one is constituted by a connection of two thyristors in anti-parallel with each other, whereas the other two are formed by a series connection of on one hand an IGBT connected in anti-parallel with a first diode and on the other an IGBT having the opposite conduction direction to the IGBT first mentioned connected in anti-parallel with a second diode. In one of them the emitters and in the other one the collectors of the IGBTs are connected to each other.

FIG. 4a illustrates a further possibility to modify an apparatus according to FIG. 2 by providing a VSC-converter having only one phase leg, so that one output of this converter is formed by a midpoint 30 of the direct voltage intermediate link separated from both said positive and negative poles by at least one capacitor 31, 32. The semiconductor devices of the apparatuses according to these embodiments are controlled by a control unit 7 schematically indicated only in FIG. 2.

Figure 4B:
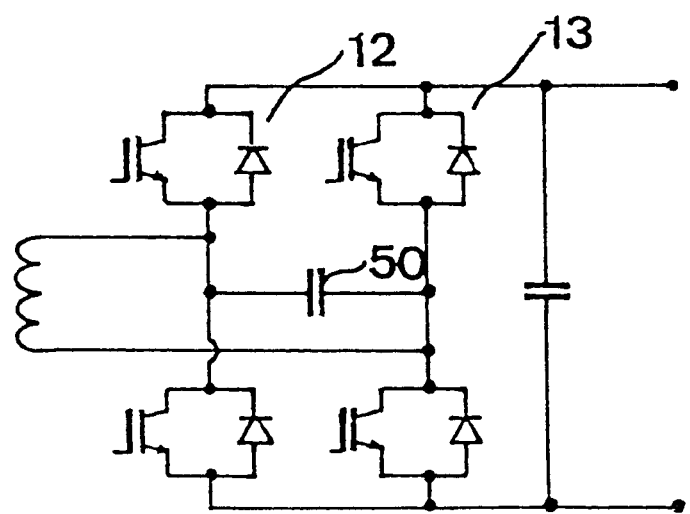

FIG. 4b illustrates a still further possibility to modify an apparatus according to FIG. 2 by providing a VSC-converter in which the snubber capacitors of each current valve have been replaced by one single capacitor 50 interconnecting the midpoints of the phase legs 12, 13. An advantage of this embodiment is that only one capacitor is needed instead of four.

Figure 4C:
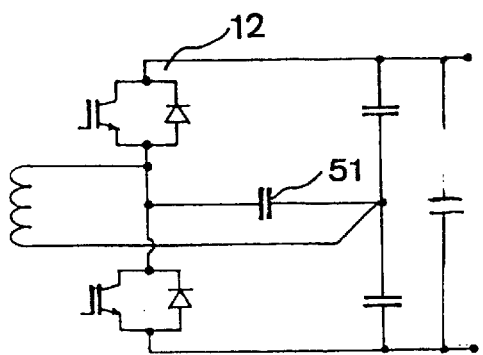

FIG. 4c illustrates another possibility to modify an apparatus according to FIG. 2 by providing a VSC-converter differing from that in the embodiment according to FIG. 4a by the fact that the snubber capacitors of each current valve have been replaced by one single capacitor 51 interconnecting the midpoint of the phase leg 12 and the midpoint of the direct voltage intermediate link. This results in the same properties of the VSC-converter as for the one in FIG. 4a, and it will be controlled in the same way, but an advantage is that only one capacitor is needed instead of two.

It is pointed out that the present invention also covers embodiments having snubber capacitors both in parallel with the current valves as shown in for instance FIG. 4a and between midpoints as shown in FIGS. 4b and 4c.

The different properties and differences in operation behaviour of these embodiments will be described further below.

We will now make some definitions to be used when explaining different phenomena below.

The coupling functions for the AC side converter may be written:

$$u_{AC,i} = N_{tr} u_{tr} k_{AC,i}$$

$$i_{tr} = N_{tr}(k_{AC,1} i_{AC,1} + k_{AC,2} i_{AC,2} + k_{AC,3} i_{AC,3})$$

where $k_{AC,i}$ equals $-\frac{1}{2}$ if phase leg i. connects the corresponding AC side terminal to the lower end of the second transformer winding and $+\frac{1}{2}$ if it connects the AC terminal to the upper end of the second transformer winding. $N_{tr}$ is the turns ratio of the transformer.

Correspondingly, for the DC side converter for the case with two phase legs the following relation applies:

$$u_{tr} = U_d (k_{DC,1} - k_{DC,2})$$

and for the case with one phase leg:

$$u_{tr} = U_d k_{DC,1}$$

where $k_{DC,i}$ equals $-\frac{1}{2}$ if phase leg i. connects the corresponding transformer terminal to the lower DC link pole (negative) and $+\frac{1}{2}$ if it connects the transformer terminal to the upper DC link pole (positive).

The switching states of the VSC-converter and the direct converter may be changed by commutation of the phase legs thereof, which means for the VSC-converter that the output of a phase leg thereof is moved from being connected to one pole of the direct voltage intermediate link to the other pole thereof. For the direct converter the phase output of the phase leg is moved from being connected to one end of the second transformer winding to be connected to the other end of that winding. The assumption is made that the inductances of the line filter 50 are much larger than the leakage inductance of the transformer and large enough to keep the currents on the alternating voltage side, $i_{AC,i}$ essentially constant during the interval between two commutations of the converters in the system. Likewise, the capacitance of the direct voltage link is assumed to be much larger than the snubber capacitances of the valves in the VSC-converter and large enough to keep the direct voltage, $U_d$, essentially constant during the interval between two commutations of the converters in the system. Under these assumptions the following is valid:

The direction of the current $i_{tr}$ through the transformer is determined by the switch state of the direct converter and the directions of the alternating voltage side currents $i_{AC,i}$, whereas the sign of the voltage across the transformer $u_{tr}$ is determined by the switch state of the VSC-converter.

The condition that has to be fulfilled for enabling commutation of the VSC-converter is $u_{tr} i_{tr} > 0$, i.e. the power flow is directed out of that converter towards the AC side.

Figure 5A:
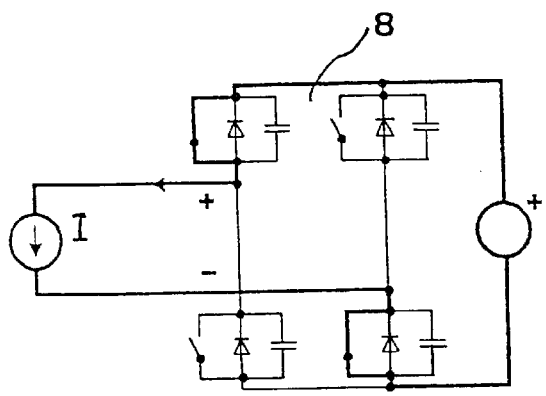
FIGS. 5a–d are circuit diagrams of the direct voltage side of the apparatus according to FIG. 2 in different states during a procedure for commutating the two phase legs simultaneously.
Figure 5B:
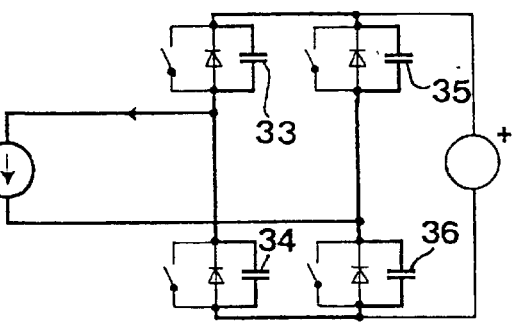
Figure 5C:
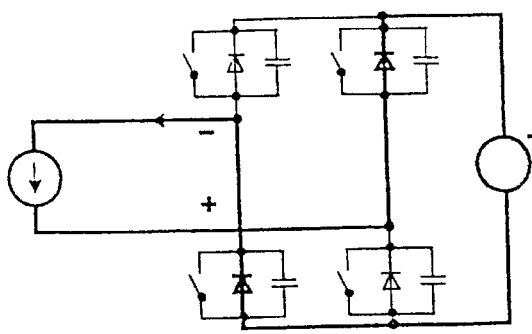
Figure 5D:
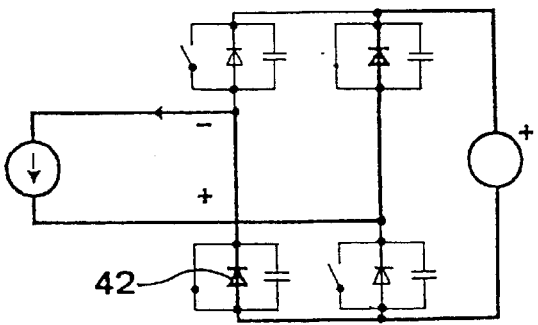

FIGS. 5a–d illustrates a procedure for changing the switching state of the VSC-converter. In this and the following circuit diagram figures the instantaneous current path is indicated by thicker lines. It is in FIGS. 5a–d assumed that the switching state of the direct converter is unchanged, which means that the current through the transformer $i_{tr}$ will be constant. The two semiconductor devices in the current valves that carry the current are firstly turned off (FIG. 5b) thus diverting the current to the snubber capacitors 33–36. As the capacitors are recharged $u_{tr}$ changes from $+U_d$ to $-U_d$. The voltage derivatives and thus the stresses on the valves will be remarkably reduced thanks to the existence of the capacitors. Finally, the diodes of the opposite valves take over the current and the commutation is completed. At this stage the semiconductor devices (IGBTs) that are antiparallel to the conducting diodes are turned on at zero-voltage and zero-current conditions (FIG. 5d).

Figure 6A:
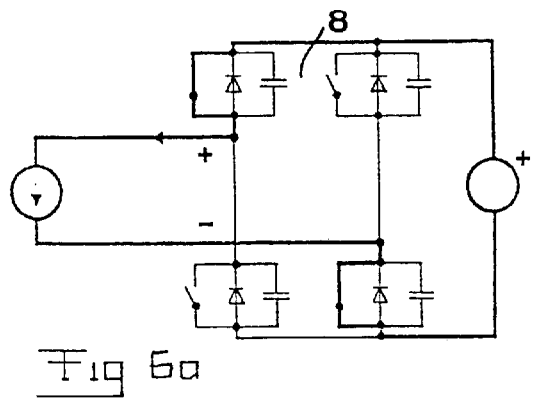
FIGS. 6a–f are views corresponding to those of the FIGS. 5a–d for a procedure of commutating one phase leg at a time.
Figure 6B:
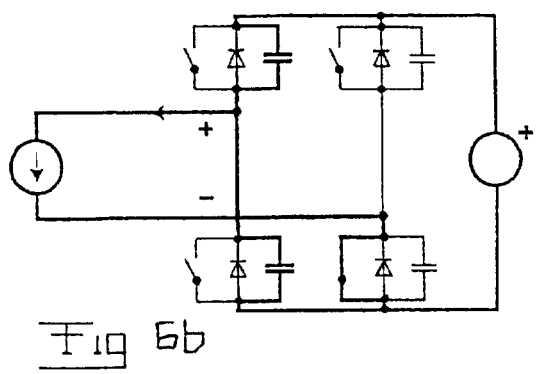
Figure 6C:
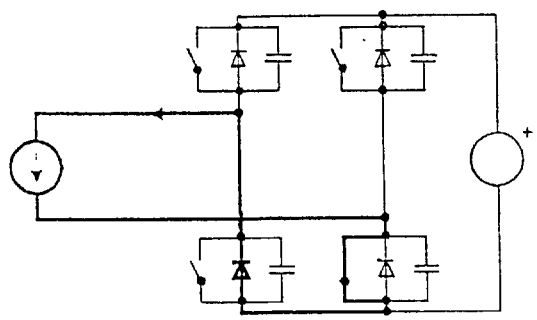
Figure 6D:
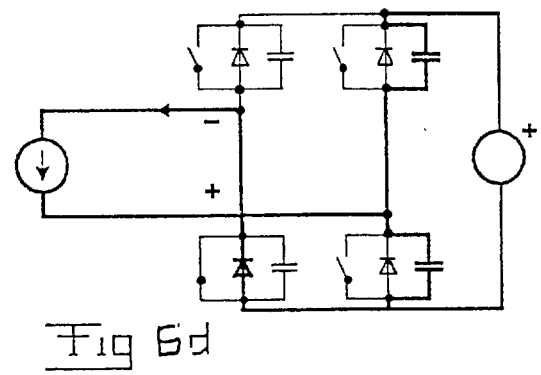
Figure 6E:
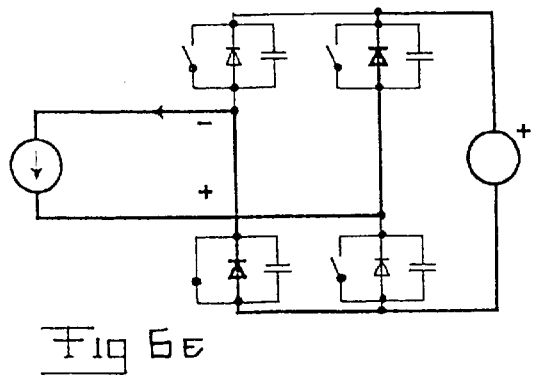
Figure 6F:
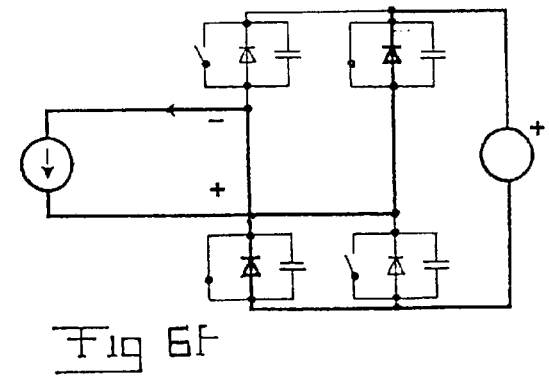

FIGS. 6a–f show an alternative way of commutating the VSC-converter, in which one phase leg is commutated at a time. After the commutation of the first phase leg $u_{tr}$ and thereby also $U_{Ac}$ becomes zero as the current free-wheels (FIG. 6c). It is obvious that the commutation processes described could have been carried out analogously if $u_{tr}$ and $i_{tr}$ were both negative. However, when arriving to the switching states according to FIGS. 5d and 6f it is not possible to go back to the switching state according to FIGS. 5a and 6a, respectively, without first changing the direction of the current $i_{tr}$ through the transformer by changing the switching state of the direct converter.

For commutation of a phase leg of the direct converter to be possible the following condition has to be fulfilled:

$$k_{AC,i} i_{AC,i} u_{tr} < 0$$

Figure 7A:
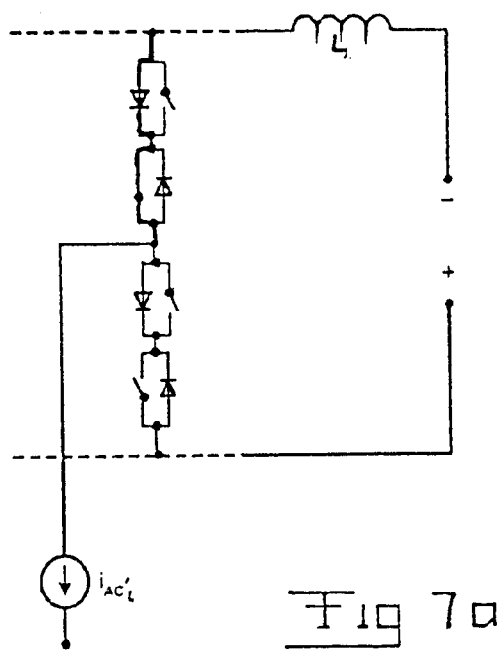
FIGS. 7a–c are simplified circuit diagrams of one phase leg of the direct converter of an apparatus according to the invention in different states during a procedure for commutating this phase leg.
Figure 7B:
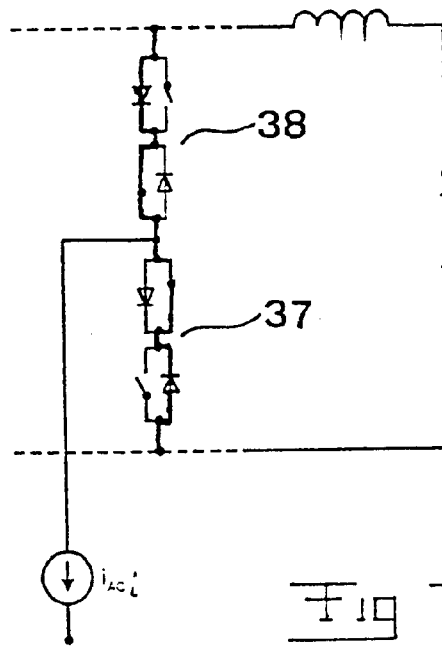
Figure 7C:
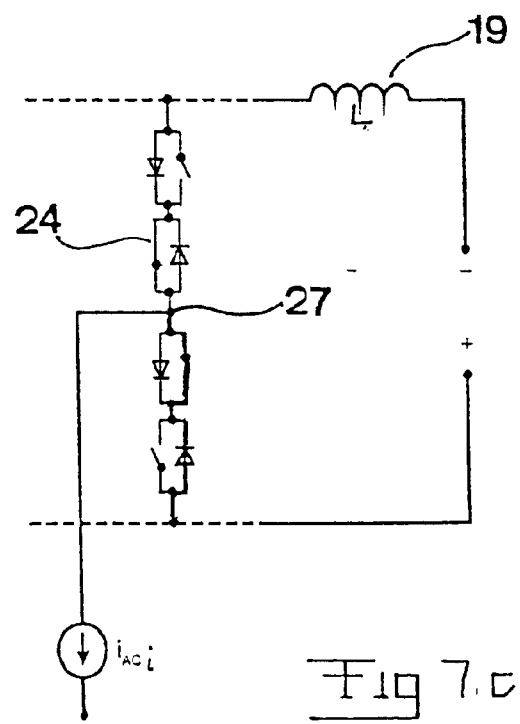
Figure 8D:
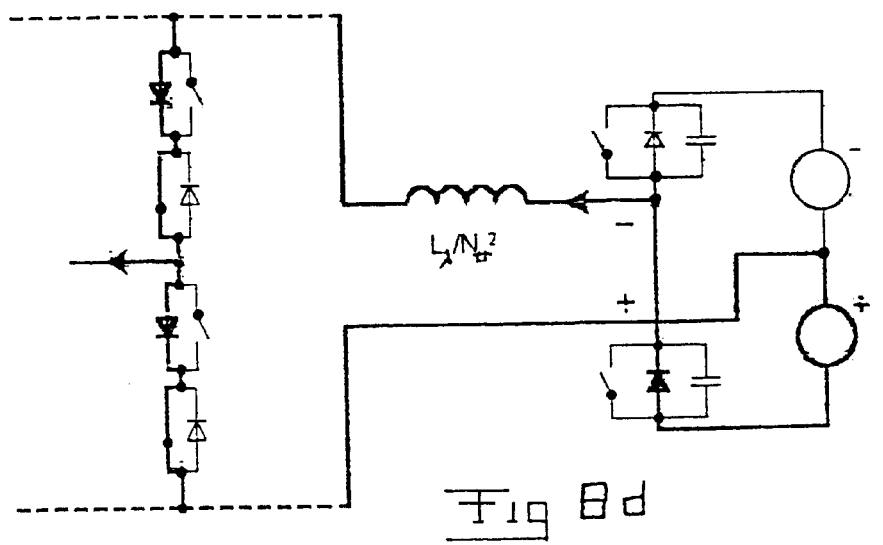
Figure 8E:
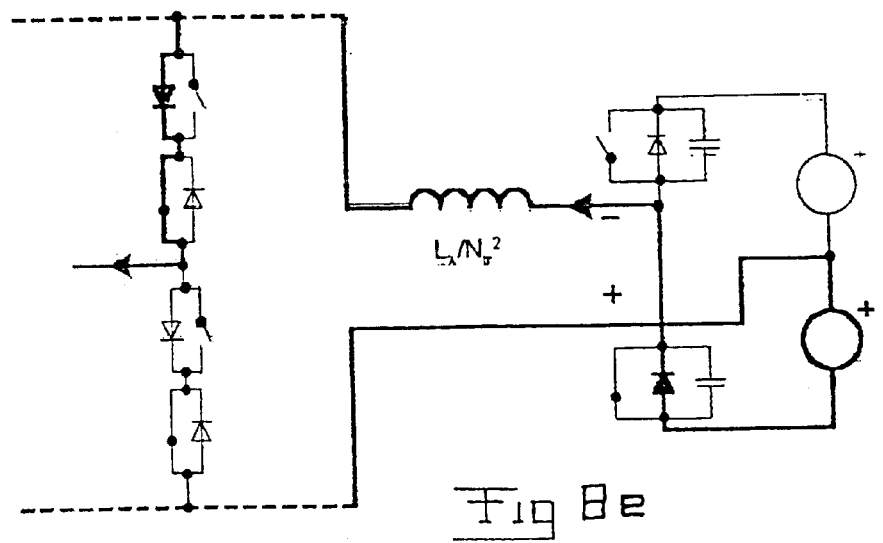
Figure 8F:
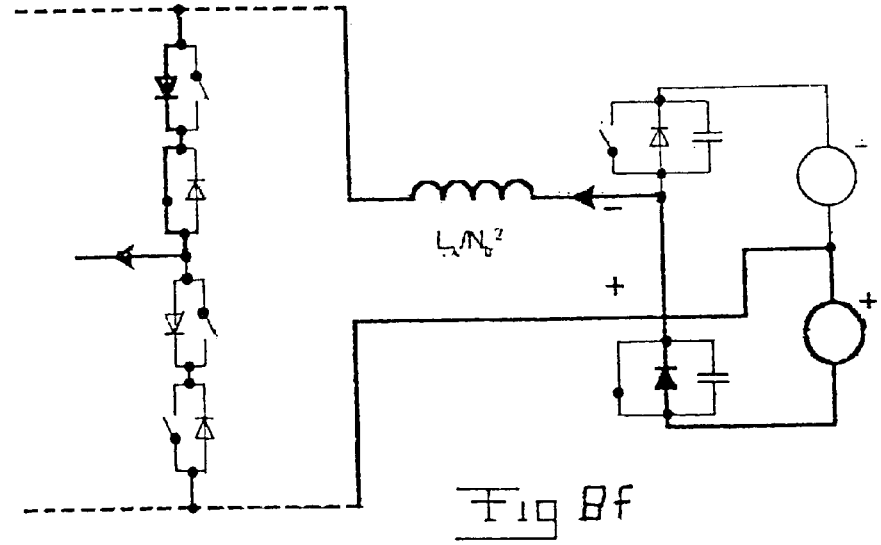

The effect of commutation of one phase leg of the direct converter is that the output thereof is shifted from being connected to one end of the second transformer winding to the other end thereof. This corresponds to a sign reversal of the coupling function $k_{AC,i}$. FIGS. 7a–c illustrate how the commutation of a phase leg may be carried out. Initially the upper valve conducts the current, i.e. $k_{AC,i} = \frac{1}{2}$. To start the commutation the semiconductor switch in the lower valve 37 that blocks the voltage applied to the phase leg is turned on. Thereby the phase leg is short-circuited and the voltage instead appears across the leakage inductance of the transformer. The current in the transformer starts changing and correspondingly the lower valve takes over the current from the upper valve 38. Finally, the current through the upper valve reaches zero and the diode that initially carried the current turns off. After this the semiconductor switch that initially carried the current is turned off at zero-current. It should be noted that two or more phase legs may be commutated simultaneously. In some cases this can be of great advantage in order to speed up the commutation sequences.

As already briefly discussed above it may not be possible to commutate the VSC-converter in the fashion described with reference to FIGS. 5 and 6. The current through the transformer may be insufficient for recharging the snubber capacitors regardless of the switch state of the direct converter. The recharge of the snubber capacitors may take too long time or in the extreme case when $i_{AC,i}$, i=1, 2, 3, all equal zero it will not occur at all. In these situations a method based on resonantly assisted commutation may be used. This method will now be described with reference to FIGS. 8*a–f*. In short, the method consists in switching both converters simultaneously in order to form a resonance circuit between the snubber capacitances and the leakage inductance of the transformer. FIGS. 8*a–f* show a simplified model of the system that can be used for analysing the resonantly assisted commutation for the case where the direct voltage side is equipped with one phase leg. In the first step (FIG. 8*b*) one or several phase legs of the alternating voltage side converter are switched so as to provide a path for the current in the direction of $u_{tr}$. The current through the transformer starts increasing linearly. In this state the current is allowed to increase by a certain amount, denoted enhancement current, $i_{enh}$. The required duration is equal to:

$$t_{enh} = \frac{2 L\lambda \cdot i_{enh}}{N_{tr}^2 \cdot U_d}$$

L$\lambda$ is the leakage inductance of the transformer expressed with respect to the second winding. When $t_{enh}$ has elapsed the semiconductor device in the VSC-converter that is carrying current is turned off. Thereby a resonant process (FIG. 8*c*) governed by the snubber capacitances and the leakage inductance of the transformer is initiated. Through this process the snubber capacitances are recharged so that the potential of the phase terminal of the phase leg swings to the opposite direct voltage rail. This also means that $u_{tr}$ goes from +$U_d$/2 to −$U_d$/2 or vice versa. When this is completed the diode that initially blocked the direct voltage takes over the current and the semiconductor device that is anti-parallel to it is turned on at zero-voltage and zero-current conditions. The current $i_{tr}$ is forced down linearly until it reaches the initial level. At this stage the valves of the alternating voltage side converter, that were turned on initially, turn off by natural commutation and the process is completed. Note that the enhancement current can be used to compensate for losses in the resonant circuit to ensure that the snubber capacitors are completely recharged before the free current path on the alternating voltage side is broken. It can also be used to compensate for variations in the alternating voltage side currents, $i_{AC,i}$, during the commutation process.

Figure 9:
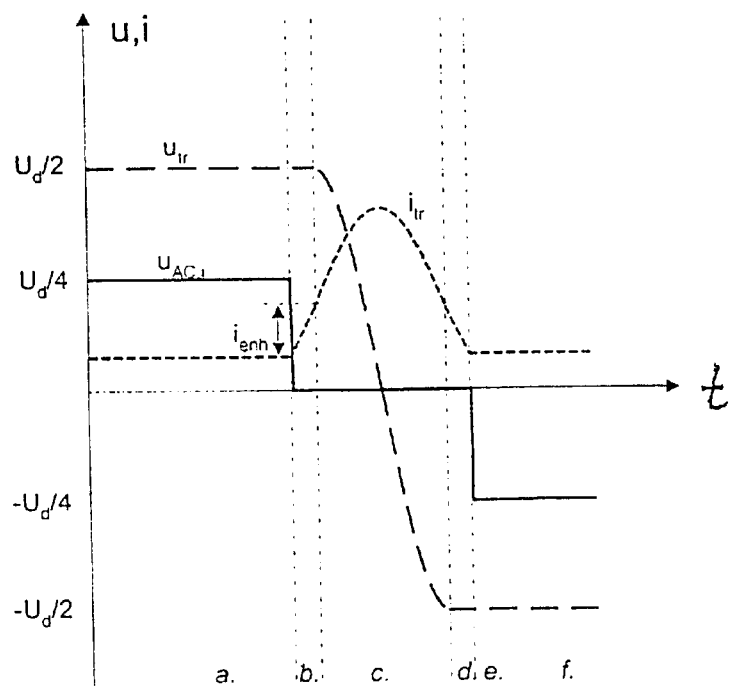
FIG. 9 is a graph illustrating voltages and currents versus time for the procedure according to FIGS. 8a–f, FIGS. 10a–f are circuit diagrams of an apparatus according to the invention in different states during a procedure for resonantly assisted commutation of the VSC-converter thereof, in which the two phase legs of the VSC-converter are commutated simultaneously.

It is illustrated in FIG. 9 how $u_{AC,i}$, $u_{tr}$ and $i_{tr}$ develop over time during the different states illustrated in FIGS. 8*a–f*. $N_{tr}$ has in this figure for simplicity been considered to be 1.

FIG. 10*a* shows a simplified model of the system that can be used for analysing the resonantly assisted commutation for the case where the VSC-converter is equipped with two phase legs.

Similarly as for a normal commutation of the VSC-converter there are principally two ways of performing the resonantly assisted commutation. The first alternative, in which both phase legs are commutated simultaneously, is shown in FIGS. 10*a–f*. In the first step (FIG. 10*b*) one or several phase legs of the alternating voltage side converter are switched so as to provide a path for the current in the direction of $u_{tr}$. The currents through the transformer starts increasing linearly. In this state the current is allowed to increase by a certain predefined amount, denoted enhancement current, $i_{enh}$. The required duration is equal to:

$$t_{enh} = \frac{L\lambda \cdot i_{enh}}{N_{tr}^2 \cdot U_d}$$

When $t_{enh}$ has elapsed both switches in the VSC-converter that are carrying current are turned off. Thereby a resonant process (FIG. 10*c*) governed by the snubber capacitances and the leakage inductance of the transformer is initiated. Through this process the snubber capacitances are recharged so that the potential of the phase terminals of both phase legs swing to the opposite direct voltage rail. This also means that $u_{tr}$ goes from +$U_d$ to −$U_d$ or vice versa. When this is completed the diodes that initially blocked the direct voltage take over the current and the switches that are anti-parallel to them are turned on at zero-voltage and zero-current conditions. The current $i_{tr}$ is forced down linearly until it reaches the initial level. At this stage the valves of the direct converter, that were turned on initially, turn off by natural commutation and the process is completed. Note that the enhancement current can be used to compensate for losses in the resonant circuit to ensure that the snubber capacitors are completely recharged before the free current path on the alternating voltage side is broken. It can also be used to compensate for variations in the alternating voltage side current, $i_{AC,i}$, during the commutation process.

Figure 11:
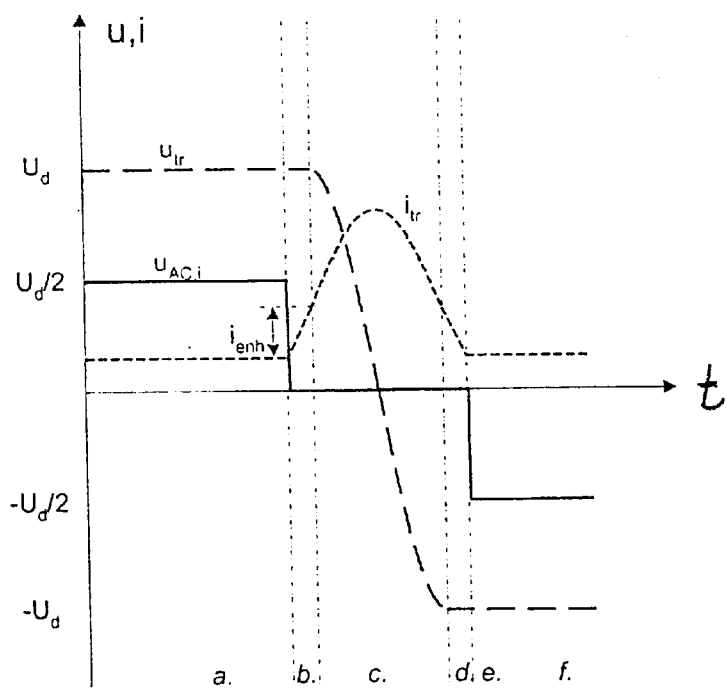
FIG. 11 is a graph illustrating voltages and currents versus time for the procedure according to FIGS. 10a–f, FIGS. 12a–h are circuit diagrams of an apparatus according to the invention in different states during a procedure for resonantly assisted commutation of the VSC-converter thereof in which the two phase legs thereof are commutated one at a time.
Figure 12A:
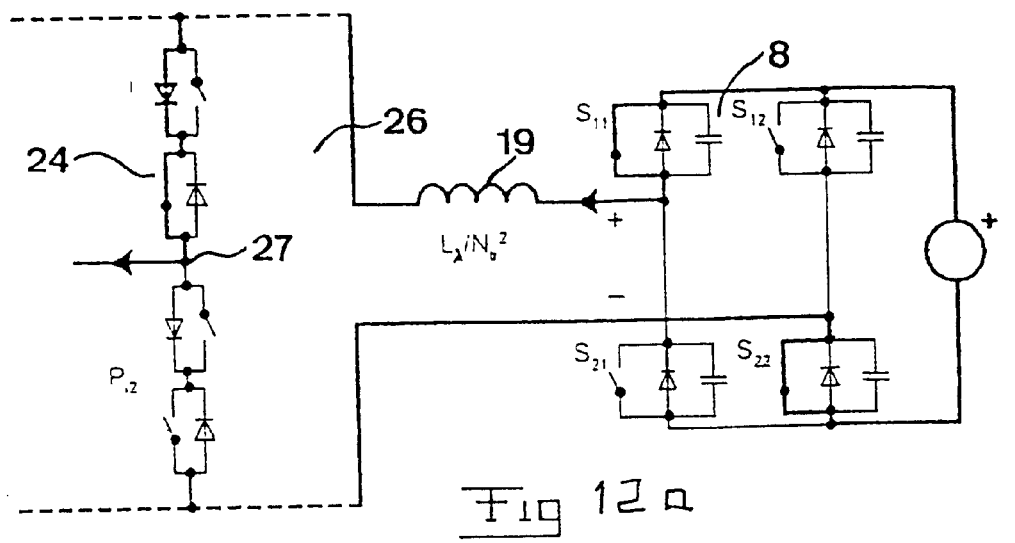
Figure 12B:
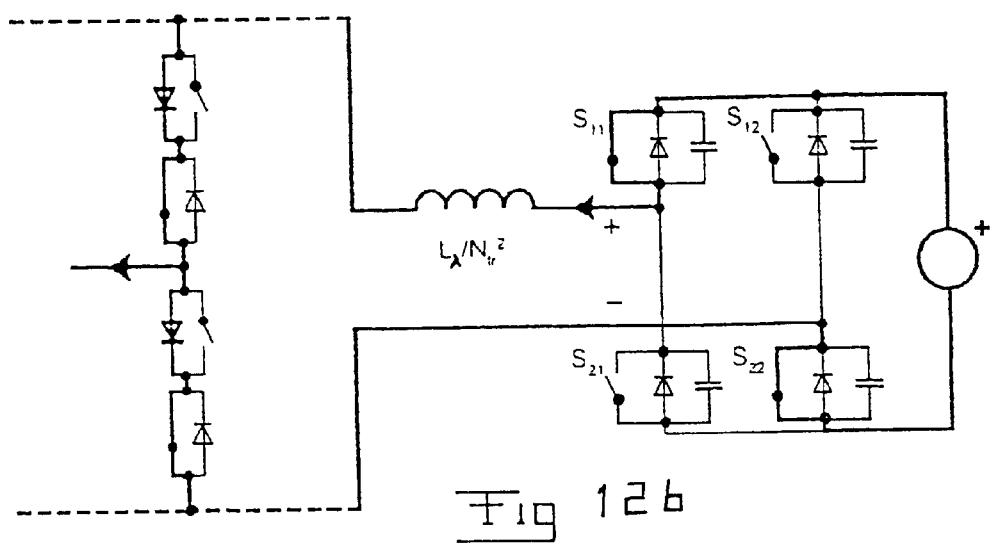
Figure 12C:
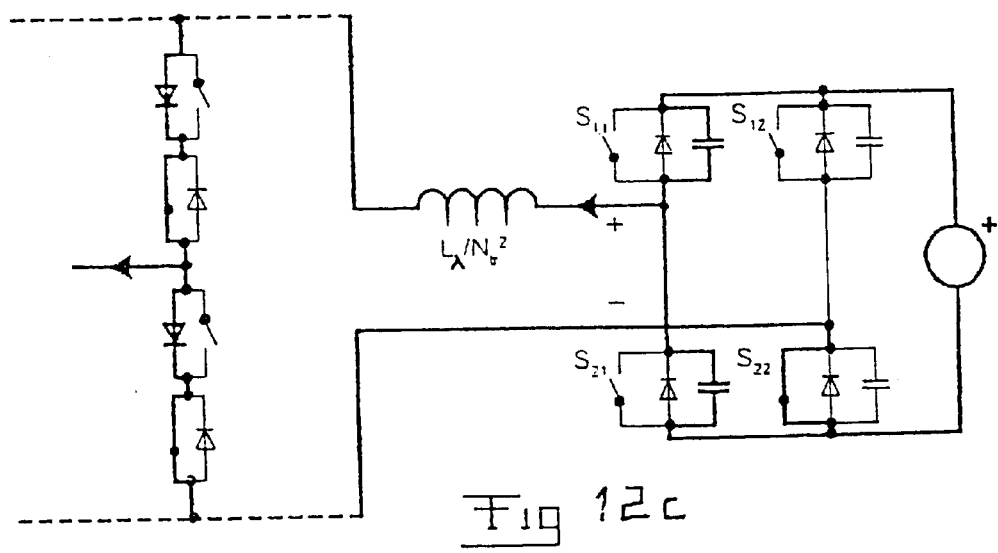
Figure 12:
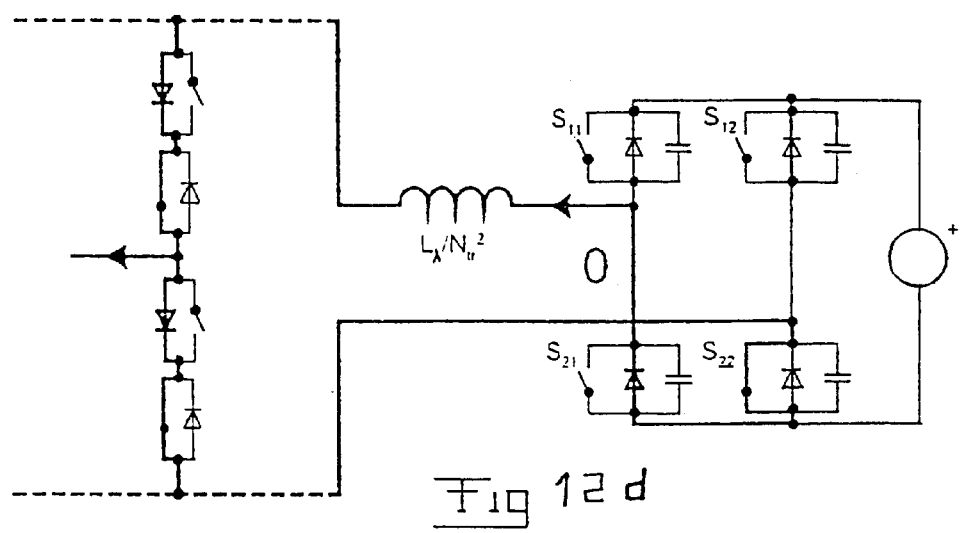
Figure 12:
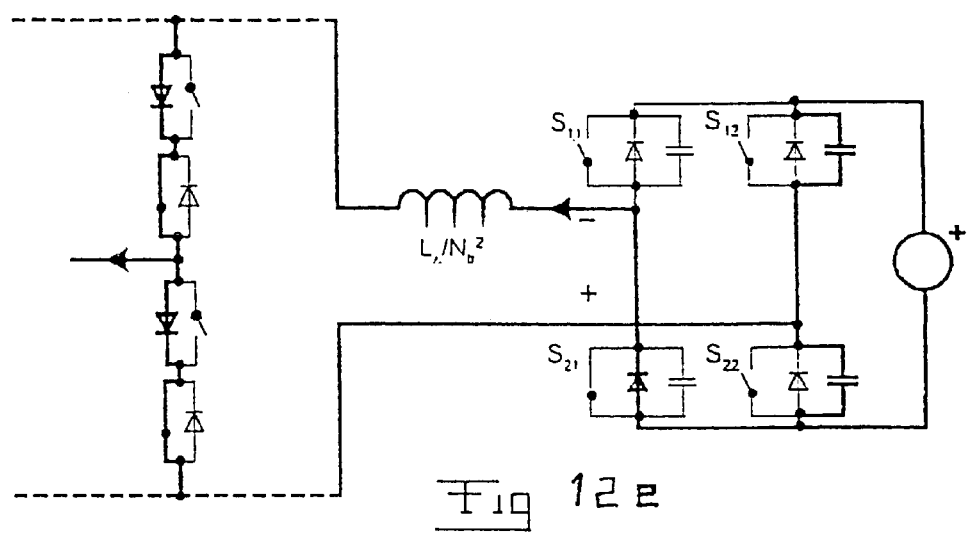
Figure 12:
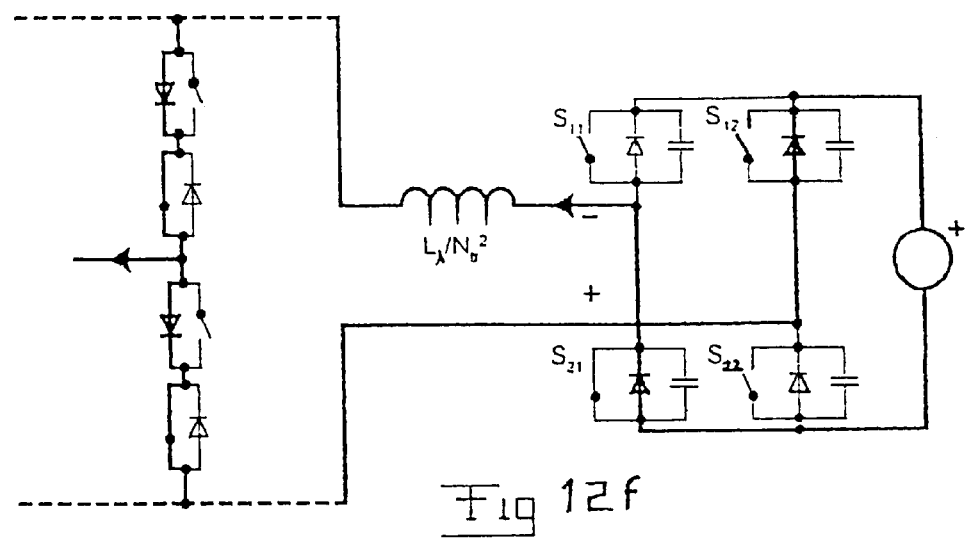
Figure 12G:
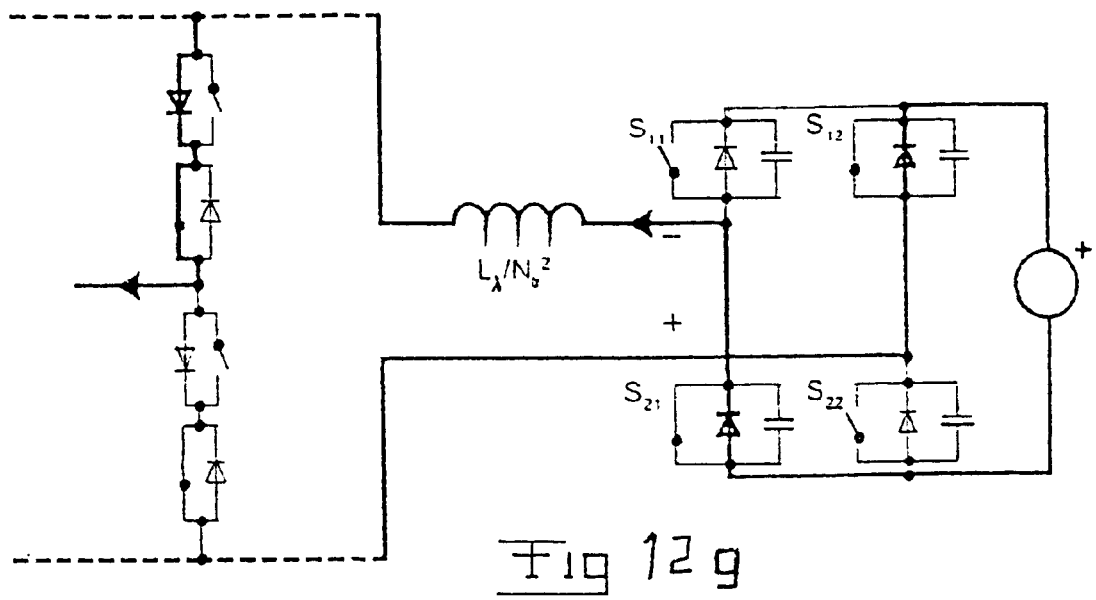
Figure 12H:
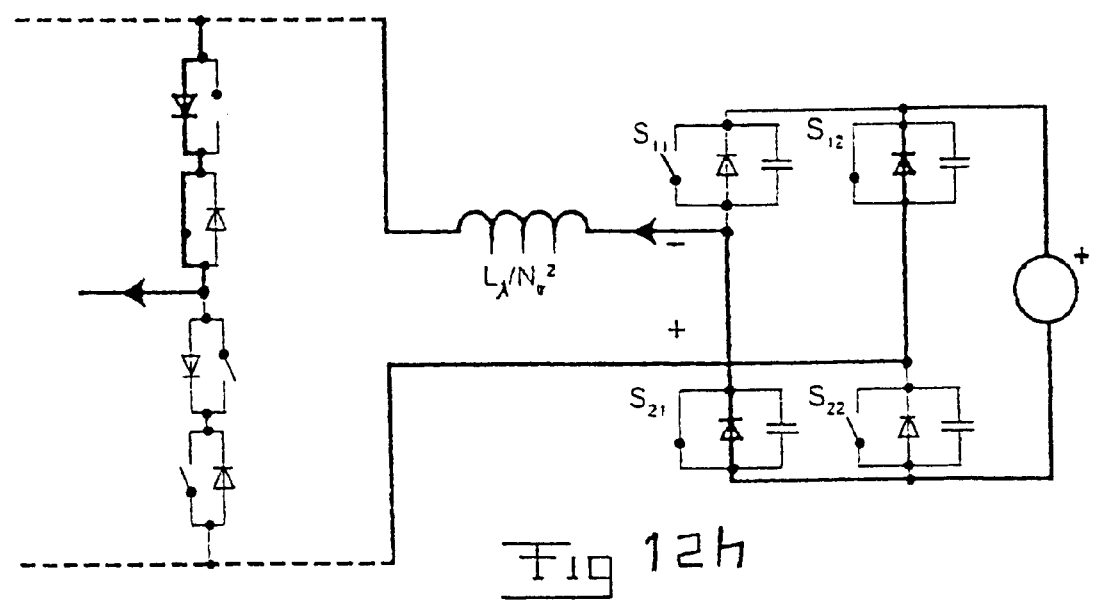

It is illustrated in FIG. 11 show $u_{AC,i}$, $u_{tr}$ and $i_{tr}$ develop over time during the different states illustrated in FIGS. 10*a–f*. It is noted that the procedures of one phase leg (FIGS. 8*a–f*) and two phase legs (FIGS. 10*a–f*) are principally the same with respect to the variables shown in FIGS. 9 and 11. $N_{tr}$ has in this figure for simplicity been considered to be 1.

It should be noted that the above description represents a full utilization of the resonant commutation method. Another alternative is to switch the phase legs of the direct converter so as to provide the said current path after the turn off of the switch(-es) (semiconductor device(-s)) in the VSC-converter. Thereby a process is obtained in which the snubber capacitors firstly are partly recharged by the non-resonant method, thereafter for a period of time the resonant current assists in the commutation, and finally the commutation is completed without the resonant current. This method has the advantage that the peak current through the transformer is reduced which leads to lower losses. The direct converter phase legs have to be switched before $u_{tr}$ reaches zero in order for the resonant process to take place.

In the second alternative, illustrated in FIGS. 12*a–h*, the VSC phase legs are switched one at a time. Initially the direct converter short-circuits the transformer in the same fashion as described above in order to increase the transformer current by a certain predefined amount. In the next step only one of the conducting switches is turned off leading to a resonance between the snubber capacitances of the concerned phase leg and the leakage inductance of the transformer. After some time a diode in the commutating phase leg takes over the current and the semiconductor device anti-parallel to this diode is turned on at zero-voltage and zero-current conditions. Thereby the system enters the state where the transformer voltage and thereby also the alternating voltage side voltage equal zero. The resonant current is still flowing through the transformer. To complete the commutation the other phase leg is commutated by turning off the remaining semiconductor device that is carrying current. The resonance between the snubber capacitors and the leakage inductance brings down the current and brings the phase potential to the opposite direct voltage rail. Again, after some time a diode in the commutating phase leg takes over the current and the semiconductor device anti-parallel to this diode is turned on at zero-voltage and zero-current conditions. Finally, the current in the transformer is forced down to the initial value and the alternating voltage side returns to its initial state by a natural commutation. Also in this case the enhancement current may be used as a means for ensuring that the commutation of the VSC-converter is rapidly completed. It can also be used to compensate for variations in the alternating voltage side currents $i_{AC,i}$, during the commutation process.

It is illustrated in FIG. 13 how $u_{AC,i}$, $u_{tr}$ and $i_{tr}$ develop over time during the different states illustrated in FIGS. 12a–h. $N_{tr}$ has in this figure for simplicity been considered to be 1.

It should be noted that the above description represents a full utilization of the resonant commutation method. Another alternative is to switch the phase legs of the direct converter so as to provide the said current path after the turn off of the switch in the first phase leg in the VSC-converter. Thereby a process is obtained in which the snubber capacitors firstly are partly recharged by the non resonant method, thereafter the resonant current assists in the commutation, and finally the commutation is completed without the resonant current. This method has the advantage that the peak current through the transformer is reduced which leads to lower losses. The direct converter phase legs have to be switched before $u_{tr}$ reaches zero in order for the resonant process to take place.

The converter system according to the present invention has similar properties as voltage source bi-directional dc/ac converters in the sense that it can provide a controllable voltage pulse train on the alternating voltage side terminal. Regardless of the polarity and magnitude of the alternating voltage side currents, $i_{AC,i}$, the alternating voltage side phase voltages, $u_{AC,i}$, can be made up of positive or negative voltage pulses. The shape of the pulse train, i.e. the polarity and duration of the pulses, is determined in such a way that certain objectives are fulfilled. As examples a few such objectives are mentioned below:

1. That the alternating voltage side phase voltages, $u_{AC,i}$, are pulse width modulated to follow desired reference signals.
2. A certain desired power flow from the direct voltage side to the alternating voltage side or vice versa.
3. A certain harmonic content in the alternating voltage side phase voltages or, indirectly, in the alternating voltage side currents.
4. A certain impedance as seen from the alternating voltage side terminals.

Figure 14:
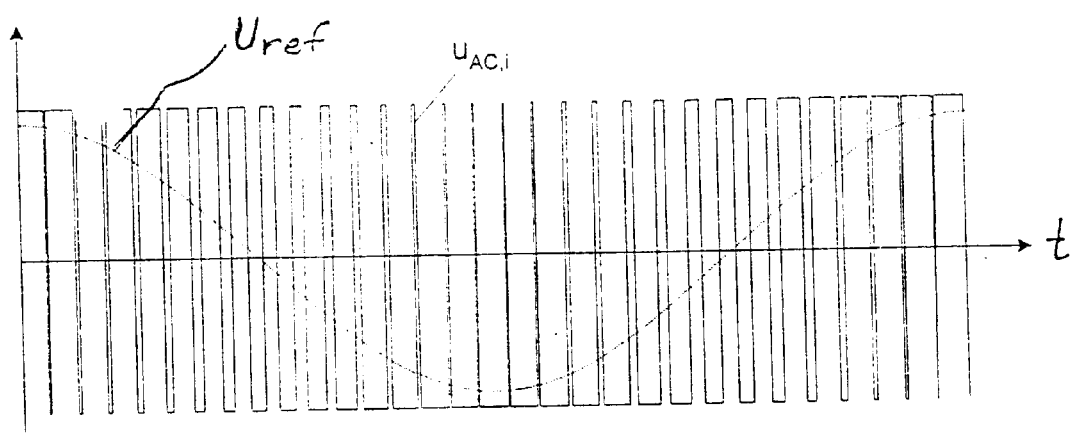
FIG. 14 is a schematical view of a possible Pulse Width Modulation pattern for the alternating phase voltage of an apparatus according to the invention.

The nature of the desired pulse pattern will in general be heavily affected by the type of application and by the nature of the circuitry connected to the alternating voltage side of the converter system. Methods for determining the shape of the pulse pattern in order to fulfil objectives such as those described above are well known and have been described extensively in the literature, see for example "Power Electronics-Converters, Applications and Design", second edition, John Wiley, 1995, Mohan, Undeland and Robbins. They will therefore not be treated here. An example of a pulse train for one of the alternating voltage side phase voltages for the case where the average voltage during a switching interval should coincide with a certain reference voltage is given in FIG. 14.

A detailed description of possible commutation sequences will now be made. By commutation sequence it is here meant a sequence, of arbitrary length, of commutations of the phase legs of the two converters in the system, which is carried out in order to achieve certain objectives. A generic commutation sequence consists of alternating between commutation of all the direct voltage side phase legs and commutation of all alternating voltage side phase legs. The assumption is made that the converter initially is in a state where the voltages of the alternating voltage side terminals are of the same sign as the corresponding currents on these terminals, i.e. that $u_{AC,i}i_{AC,i}>0$, or that $i_{AC,i}=0$, i=1, 2, 3.

I. Commutate the phase legs of the VSC-converter. This could be made in a variety of ways. Firstly, the commutations could either be of the non-resonant kind or the resonant kind. Secondly, in case the VSC-converter is equipped with two phase legs, these could either be commutated simultaneously or one at a time. In case the phase legs are commutated one at a time the interval between their respective commutations is chosen in order to obtain an interval where the transformer voltage, $u_{tr}$, and thus also the alternating voltage side phase voltages, $u_{AC,i}$, are zero. After the commutation of all phase legs in the VSC-converter the alternating voltage side phase voltages, $u_{AC,i}$, are of opposite sign as the corresponding alternating voltage side currents, $i_{AC,i}$ i.e. the power flow in the system is directed from the alternating voltage side to the direct voltage side.

II. Commutate the phase legs of the alternating voltage side converter. The phase legs will be commutated in a certain order with certain time intervals between the commutations. These time intervals include an interval before the commutation of the first phase leg as well as a time interval after the commutation of the last phase leg. One or several time intervals may very well be zero, i.e. the commutation of two or three phase legs may occur simultaneously. It should be noted that the fractions of the commutation cycle during which $u_{ac,i}=\frac{1}{2}N_{tr}U_d$ and $u_{AC,i}=-\frac{1}{2}N_{tr}U_d$ can be controlled by properly choosing the instant at which phase leg i. is commutated. After the commutation of all phase legs in the alternating voltage side converter the alternating voltage side phase voltages, $u_{Ac,i}$, are of the same sign as the corresponding alternating voltage side currents, $i_{AC,i}$, i.e. the power flow in the system is directed from the direct voltage side to the alternating voltage side. Thereby the sequence can start over again at I.

The sequence that is represented by the steps I and II above is hereafter referred to as a commutation cycle. In case the initial condition $u_{AC,i}i_{AC,i}>0$ for i=1, 2, 3 does not apply the cycle could as well begin with any other applicable step. A commutation sequence is made up of a number of commutation cycles following on each other. Note that the commutation cycles in the sequence may very well be different from each other. The time intervals mentioned above between the commutations will be determined based on a number of considerations such as:

1. The desired alternating voltage side output voltage pulse pattern, as described above.
2. The need to achieve proper operation of the transformer and avoid saturation of the transformer core.

It is possible to choose the time delays mentioned above in such a fashion that the commutation cycle is always run through at a constant frequency.

The algorithm for choosing the time intervals based on the above mentioned considerations could include a correction for the fact that the commutation does not alter the transformer voltage and the alternating voltage side output voltages instantaneously.

An example of a commutation cycle as described above is schematically illustrated in FIGS. 15a–i. The development of $u_{tr}$, $i_{tr}$ and $u_{AC,i}$, i=1, 2, 3 during this process is illustrated in FIG. 16.

Figure 15A:
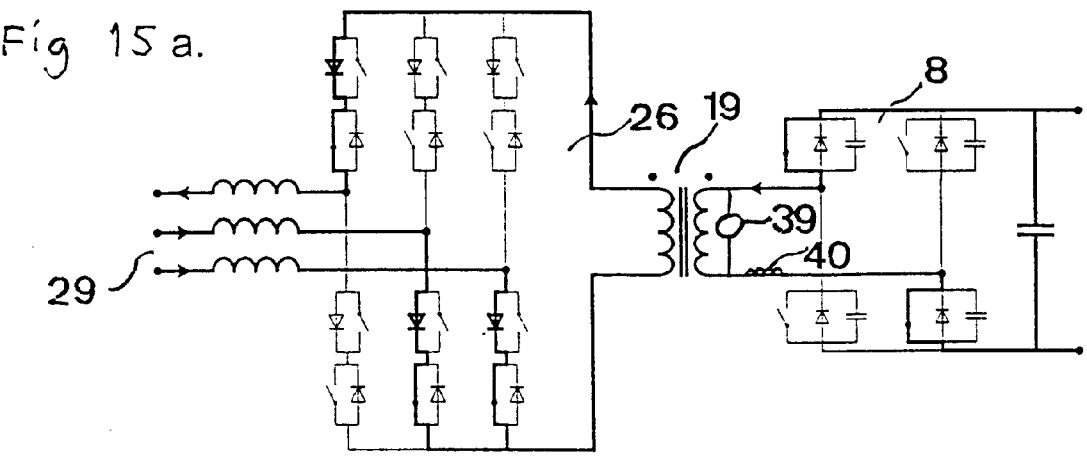
FIGS. 15a–i are circuit diagrams of an apparatus according to the invention in different states during an example of a commutation cycle not involving resonant commutation of the voltage source converter.
Figure 16:
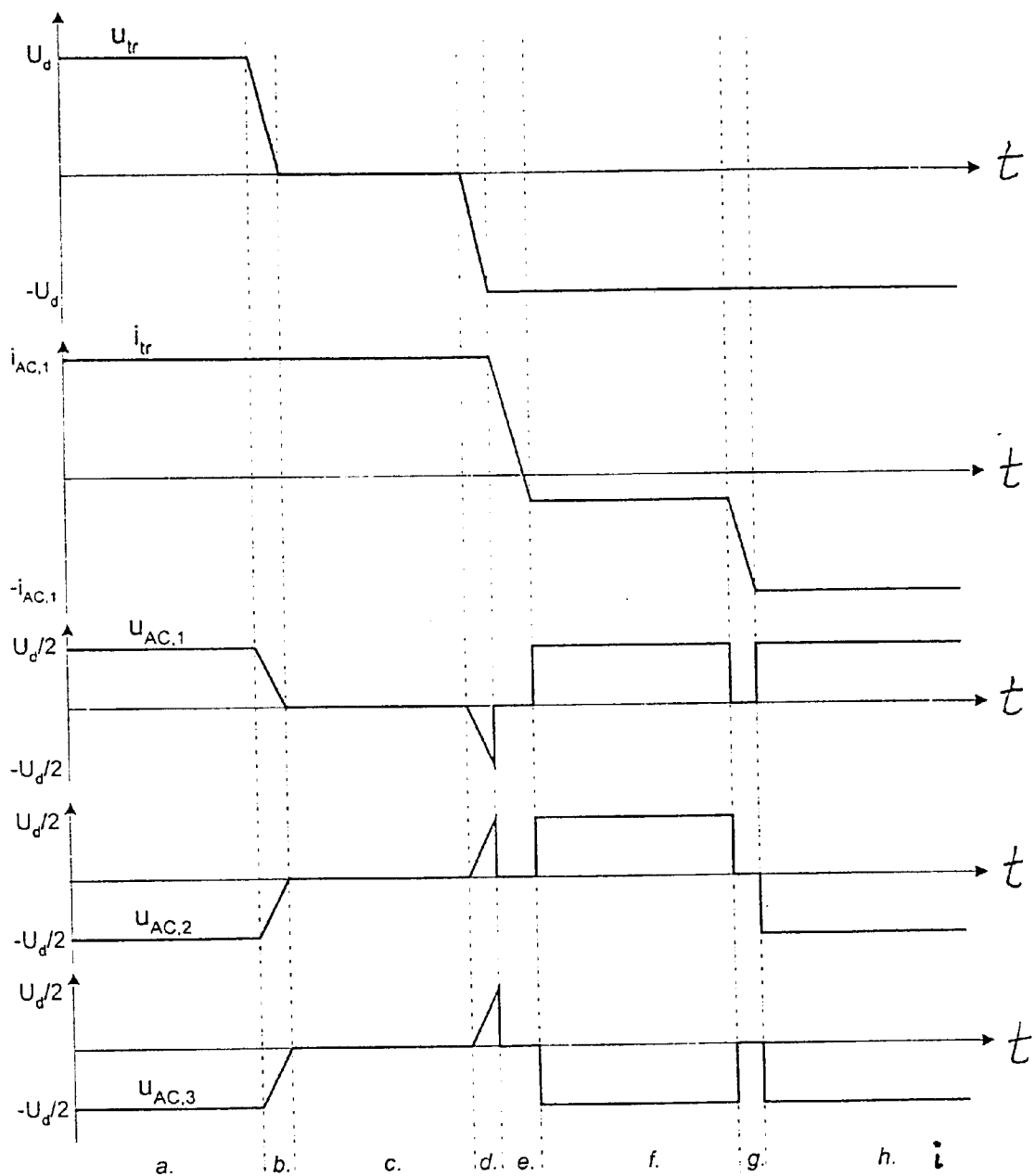
FIG. 16 is a graph corresponding to FIG. 9 for the procedure illustrated in FIGS. 15a–i, FIGS. 17a–k are circuit diagrams of an apparatus according to the invention in different states of an example of a commmutation cycle involving resonantly assisted commutation of the voltage source converter.

The steps of this commutation cycle are as follows:

FIG. 15a: Initial state. The current flows through the semiconductor switches in the VSC-converter and the power flows from the direct voltage side to the alternating voltage side.

Figure 15B:
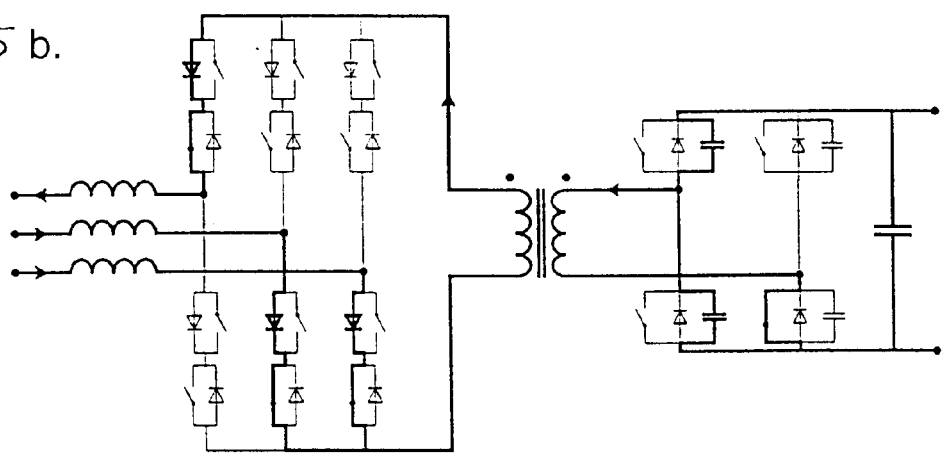

FIG. 15b: The commutation of one of the phase legs of the VSC-converter is initiated by turning off one of the semiconductor switches that carries current. Thereby $u_{tr}$ starts to decrease linearly and finally reaches zero.

Figure 15C:
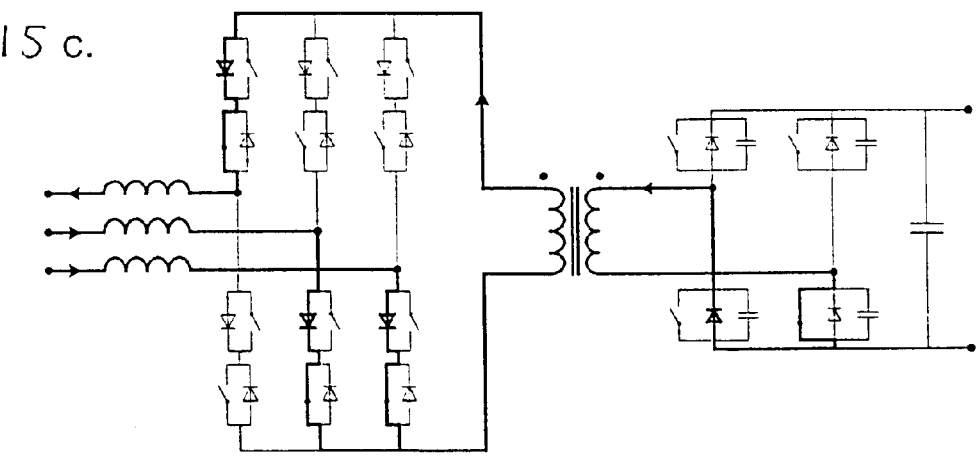
Figure 15:
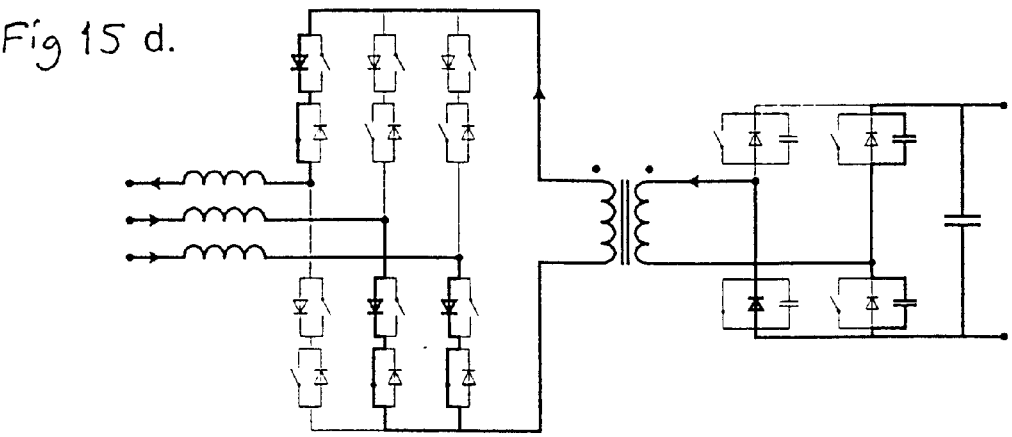
Figure 15:
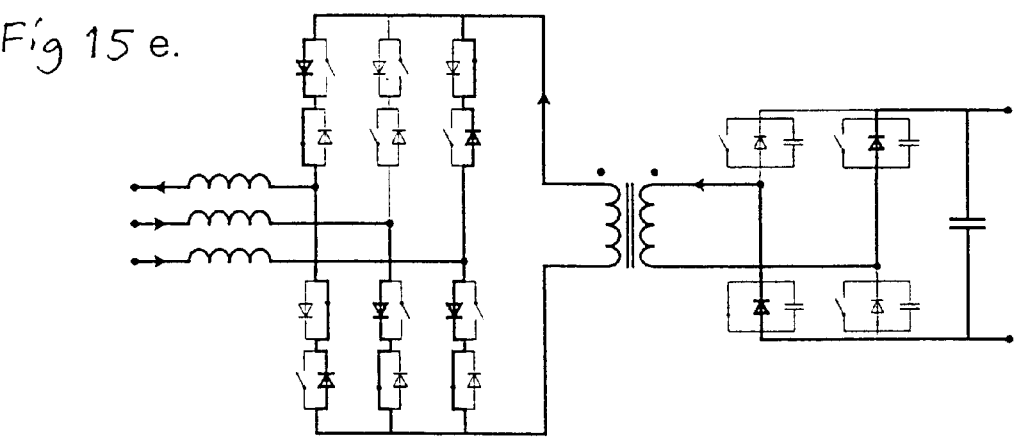
Figure 15:
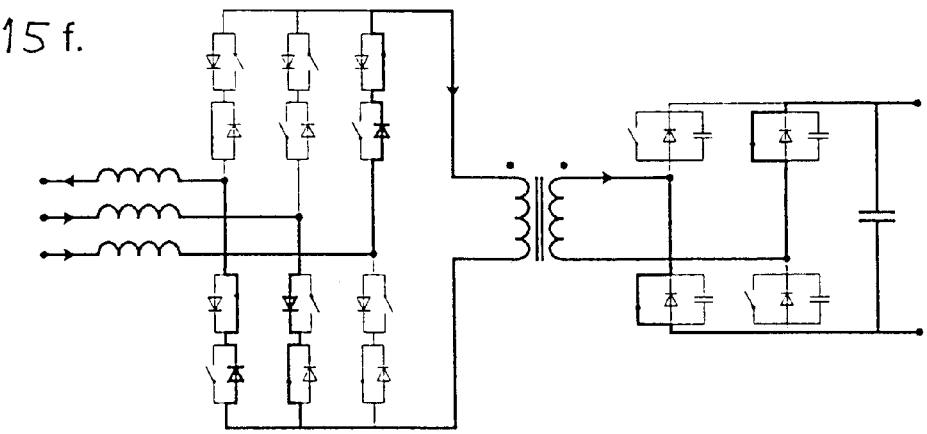
Figure 15:
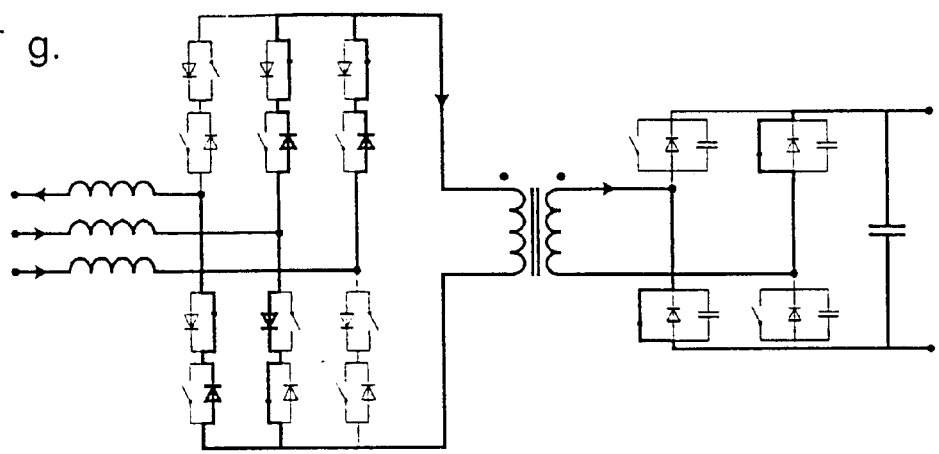
Figure 15:
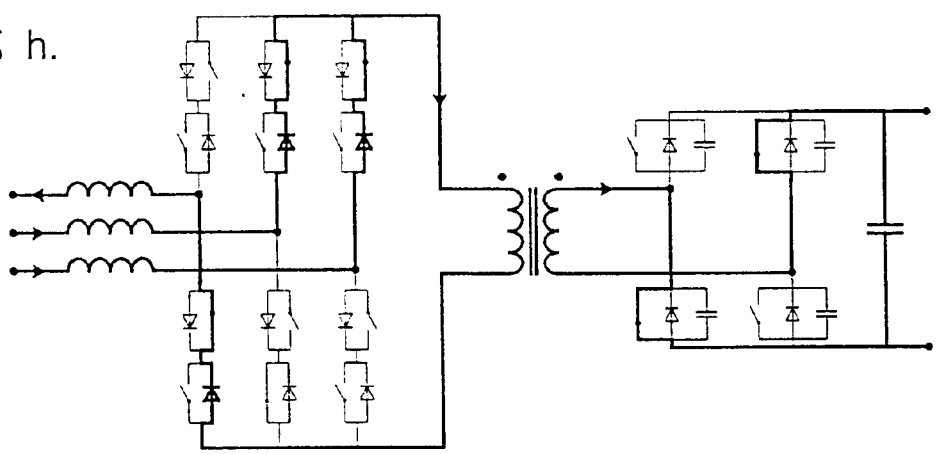
Figure 15:
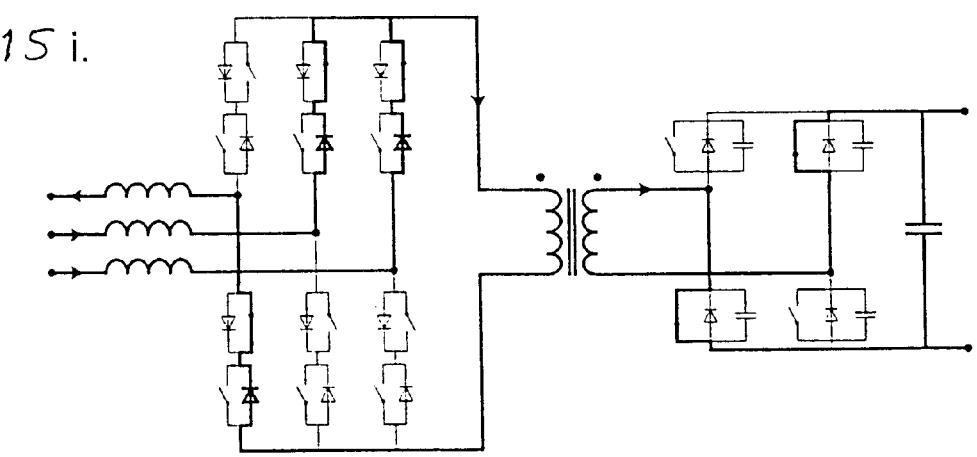

FIG. 15c: As $u_{tr}$ reaches zero the opposite diode in the commutating VSC-converter phase leg takes over the current. The switch that is antiparallel to this diode is turned on at zero-voltage and zero-current conditions. The duration of this interval is set to provide the zero-voltage interval commanded by the modulator.

FIG. 15d: The commutation of the other VSC-converter phase leg is initiated and $u_{tr}$ starts increasing in the opposite direction compared to the initial state.

FIG. 15e: As the commutation of the second phase leg of the VSC-converter is completed the commutation of phase leg 1. and 3. of the direct converter begins.

FIG. 15f: The commutation of phase leg 1. and 3. of the direct converter is completed and power again flows from he DC side to the AC side.

FIG. 15g: Finally, phase leg 2. of the direct converter is commutated.

FIGS. 15h–i: The commutation of phase leg 2. of the direct converter principally returns the system to the initial state and the commutation cycle can be repeated.

In the case the VSC-converter is equipped with two phase legs and these phase legs are commutated one at a time for several commutation cycles measures can be taken in order to achieve a uniform loading of the valves in the phase legs. This can be done by varying the order in which the phase legs are commutated in an appropriate fashion, noting that this order does not affect the way the converter couples the direct voltage capacitor to the transformer.

By alternating voltage side commutation is here meant the commutation of all phase legs, simultaneously or one at a time, in the direct converter, whereas, by direct voltage side commutation is here meant the commutation of all phase legs, simultaneously or one at a time, in the VSC-converter.

A few means of achieving rapid transitions from alternating voltage side commutation to direct voltage side commutation, or vice versa, will be described.

As mentioned above all of the phase legs of the VSC-converter have to be commutated for the commutation of the direct converter to be possible. The state that the system appears in after the direct voltage side commutation implies that each of the AC side phase voltages are of the opposite sign as the corresponding AC side phase currents. This state may not be desirable with regard to the desired pulse pattern on the AC terminal and in such a case the commutation of the direct converter should start immediately after the commutation of the VSC-converter. During the commutation of the VSC-converter the AC side phase voltages will, however, for a short period of time be such that $u_{AC,i} i_{AC,i} < 0$ for i=1, 2, 3. This period of time and the voltage-time area during the period may be reduced by starting the alternating voltage side commutation prior to the completion of the direct voltage side commutation. This is made by turning on the relevant semiconductor device or semiconductor devices of the alternating voltage side converter when the transformer voltage, $u_{tr}$, has changed sign, due to the direct voltage side commutation, and risen to a certain level. The minimum allowable value of this voltage level is determined by the demand that the direct voltage side commutation should be completed before the transformer current reaches zero as a consequence of the alternating voltage side commutation.

As mentioned above all of the phase legs of the direct converter have to be commutated for the commutation of the VSC-converter to be possible. The state that the system appears in after the alternating voltage side commutation implies that each of the AC side phase voltages are of the same sign as the corresponding AC side phase currents. This state may not be desirable with regard to the desired pulse pattern on the AC terminal and in such a case the commutation of the VSC-converter should start immediately after the commutation of the direct converter. During the commutation of the VSC-converter the AC side phase voltages will however for a short period of time fulfil $u_{AC,i} i_{AC,i} > 0$ for i=1, 2, 3. This period of time and the voltage time area during it may be reduced by starting the direct voltage side commutation prior to the completion of the alternating voltage side commutation. This is made by turning off the relevant semiconductor device or semiconductor devices of the direct voltage side converter when the transformer current $i_{tr}$ has changed sign due to the alternating voltage side commutation, and risen to a certain level. The minimum allowable value of this current level is determined by the demand that the alternating voltage side commutation should be completed before the transformer voltage reaches zero as a consequence of the direct voltage side commutation.

The two methods of altering the conventional commutation described above are hereafter referred to as interlaced commutation.

As an example the commutation cycle illustrated in FIGS. 15a–15i and FIG. 16 can be modified to incorporate interlaced commutation by starting the commutation of the direct converter phase legs 1 and 3 prior to the completion of the commutation of phase leg. 2 of the VSC. The earliest point at which the commutation of the direct converter can be started is determined by the demand that the commutation of VSC phase leg 2 should be completed before the transformer current changes direction.

In case resonant commutation is used for the direct voltage side converter and there is a desire to achieve rapid transitions, without unnecessary delays, from the alternating voltage side commutation to the direct voltage side commutation, this can be made by initiating the direct voltage side resonant commutation, by turning on the relevant semiconductor device or semiconductor devices in the alternating voltage side converter, prior to the completion of the alternating voltage side commutation. Note that this does not imply that any current will flow through these semiconductor devices before the alternating voltage side commutation is completed, but only that delays between the commutation of the two converters are avoided.

Likewise, in case resonant commutation is used for the direct voltage side converter and there is a desire to achieve rapid transitions, without unnecessary delays, from the direct voltage side commutation to the alternating voltage side commutation, this can be made by initiating the alternating voltage side commutation, by turning on the relevant semiconductor device or. semiconductor devices in the alternating voltage side converter, prior to the completion of the direct voltage side resonant commutation. Note that this does not imply that any current will flow through these semiconductor devices before the direct voltage side commutation is completed, but only that delays between the commutations of the two converters are avoided.

Figure 17:
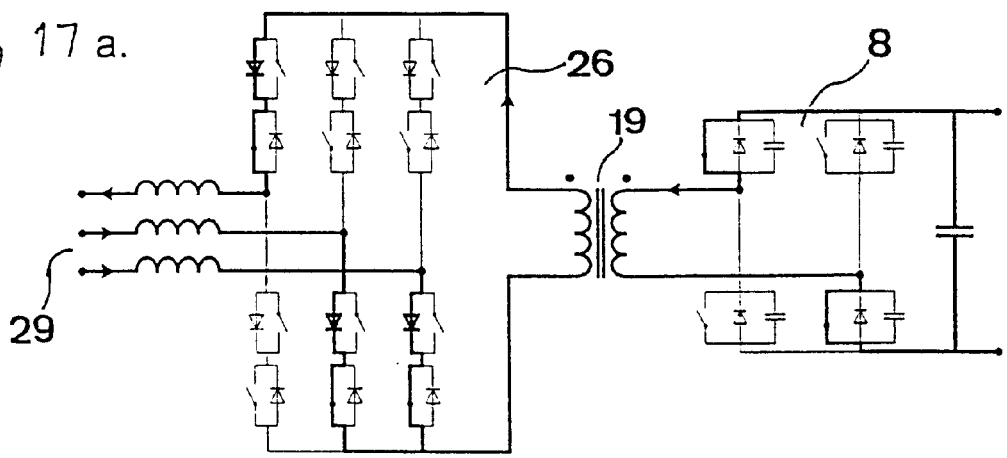
Figure 17:
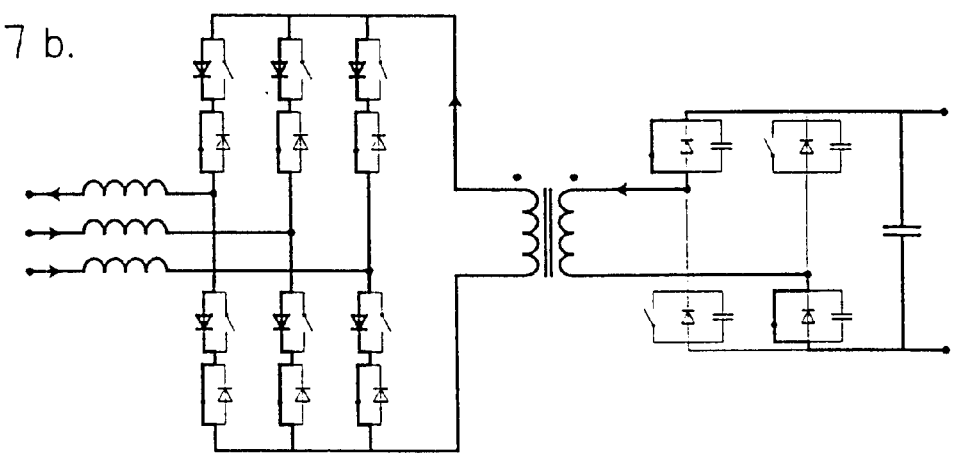
Figure 17:
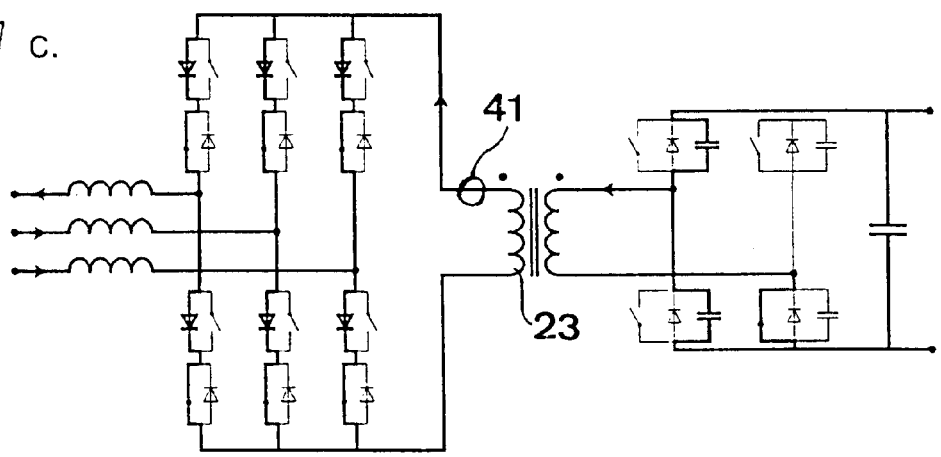
Figure 17:
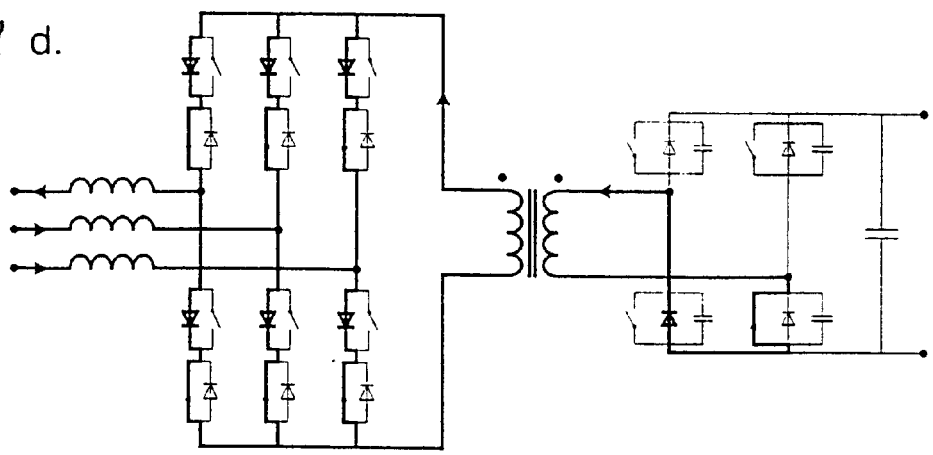
Figure 17:
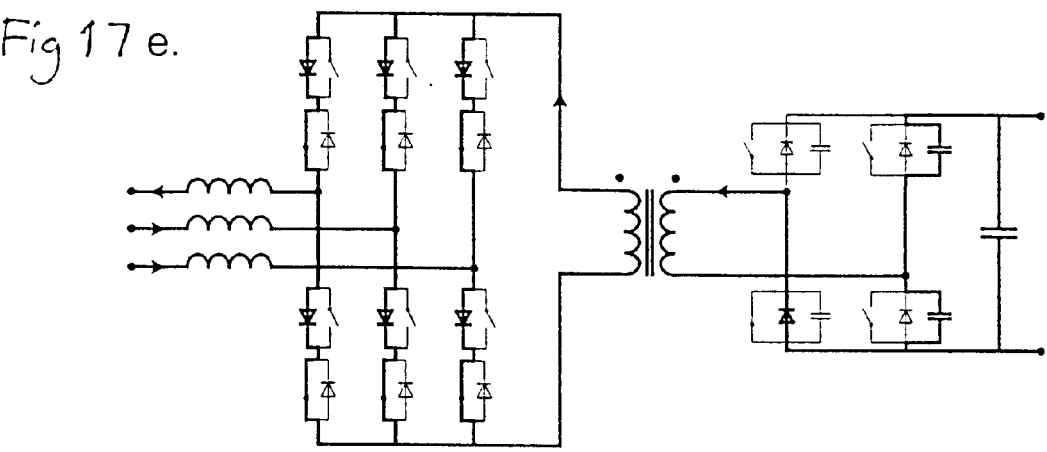
Figure 17:
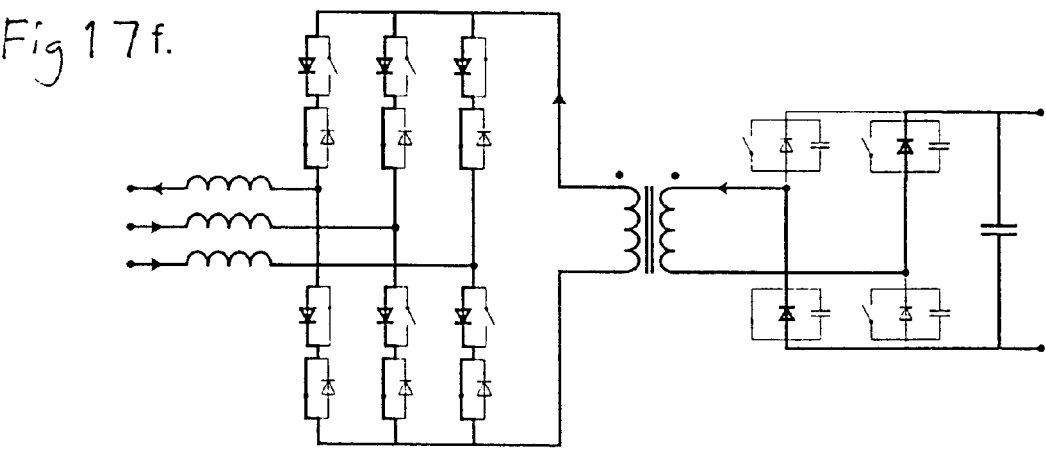
Figure 17:
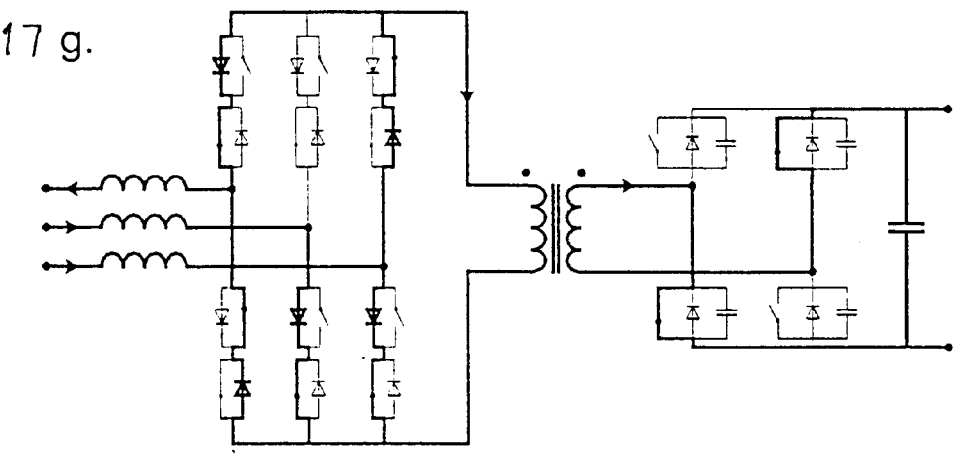
Figure 17:
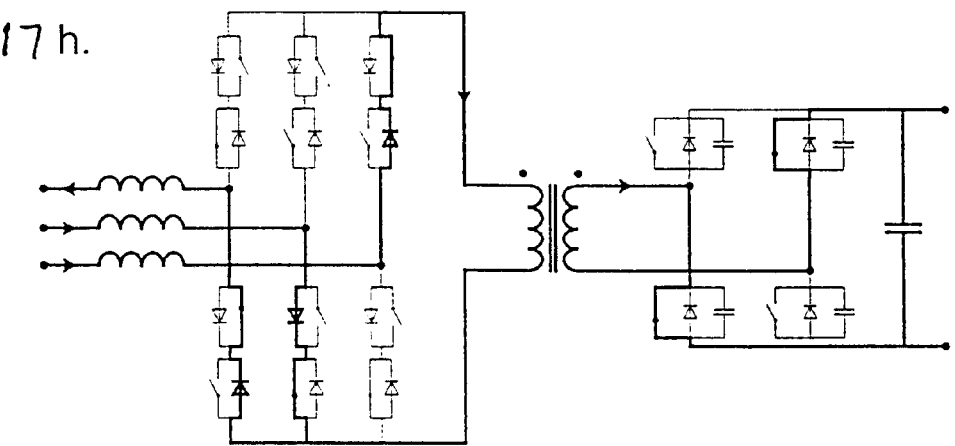
Figure 17:
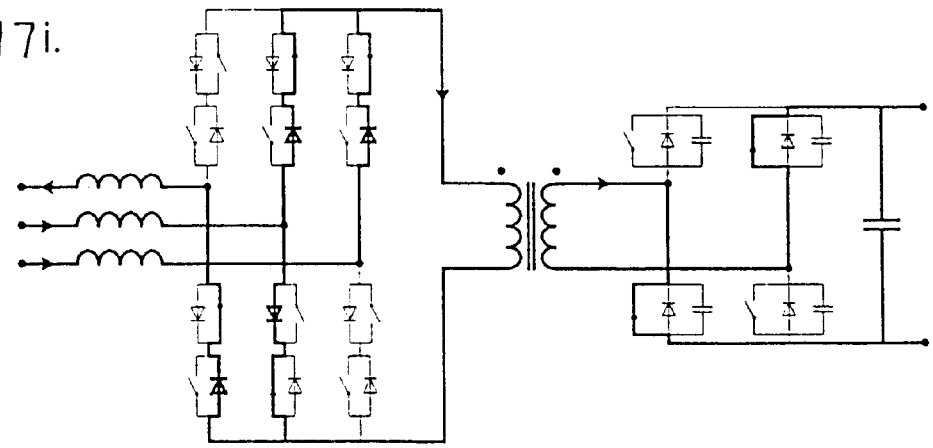
Figure 17:
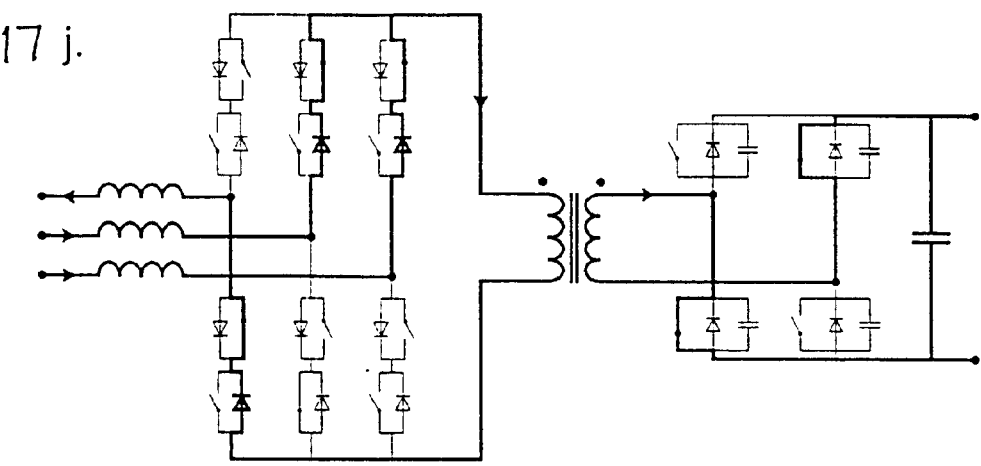
Figure 17:
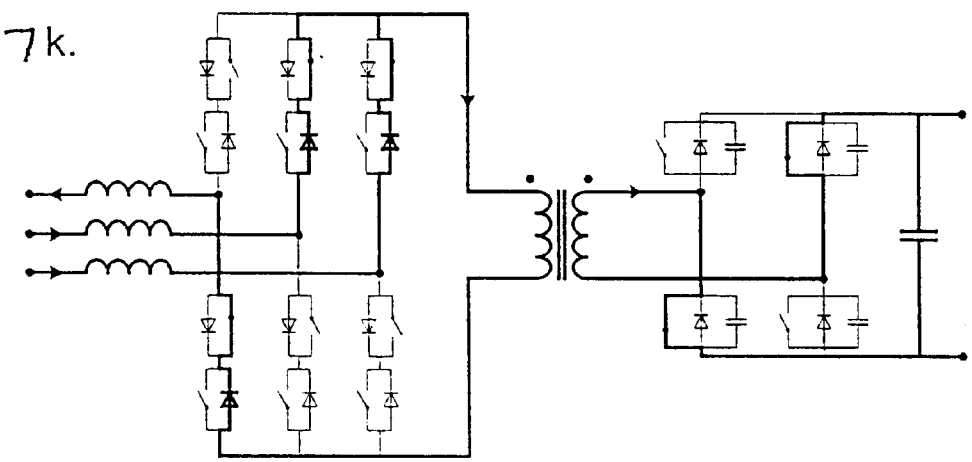
Figure 18:
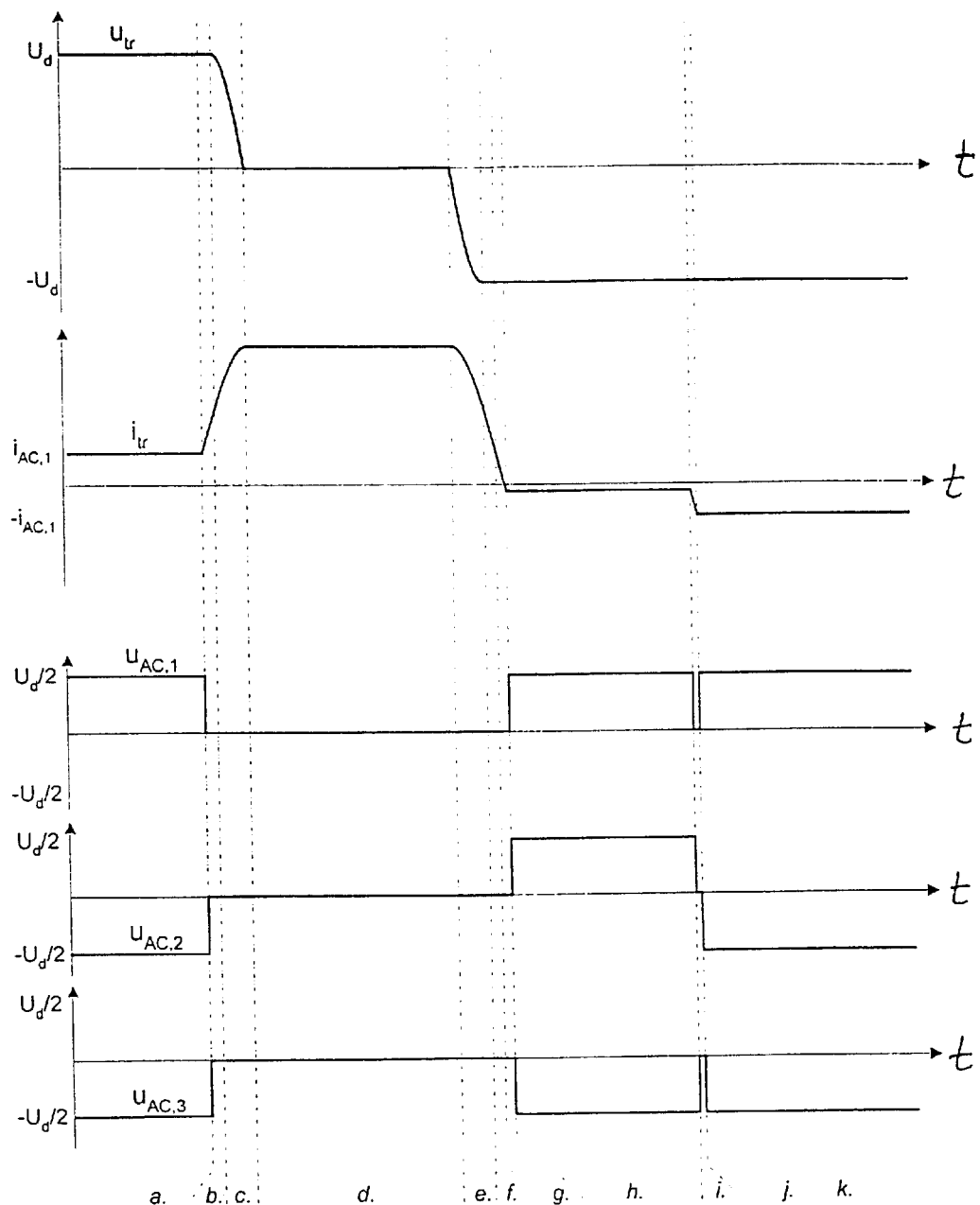
FIG. 18 is a graph corresponding to FIG. 9 for the procedure illustrated in FIGS. 17a–k.

An example of a switching cycle involving resonant commutation of the VSC-converter with a desired power flow from the alternating voltage side to the direct voltage side is illustrated in FIGS. 17a–17k. The development of $u_{tr}$, $i_{tr}$ and $u_{AC,i}$, i=1, 2, 3 during this process is illustrated in FIG. 18. $N_{tr}$ has in this figure for simplicity been set to 1. It is schematically illustrated in FIG. 17c that the apparatus comprises means 41 for detecting the current though the second transformer winding for ensuring that the current through the transformer has increased by a predetermined enhancement current value before the control of the VSC-converter for changing the switching state thereof is started.

The steps of this commutation cycle are as follows:

FIG. 17a: This is the initial stage, in which the current flows through switches in the VSC-converter and power flows from the direct voltage side to the alternating voltage side. An active voltage vector, $(N_{tr}U_d/2, -N_{tr}U_d/2, -N_{tr}U_d/2)$, is applied to the ac output.

FIG. 17b: This is the enhancement state. The phase legs of the direct converter are switched so as to provide a path for current through the transformer in the direction of the transformer voltage. This causes the transformer current to start increasing linearly.

FIG. 17c: This is the first resonant stage. When the transformer current has increased by a certain predetermined amount, the so called enhancement current, indicated by the current detecting means 41, the commutation of one of the phase legs of the VSC-converter is started. This initiates a resonance process, which recharges the snubber capacitors of the commutating phase leg and thereby brings down $u_{tr}$ to zero. Simultaneously the transformer current increases.

FIG. 17d: When the recharging of the snubber capacitors is completed a diode takes over the current in the commutating phase leg of the VSC-converter. The semiconductor switch that is antiparallel to this diode is turned on at zero-voltage and zero-current conditions. The current through the transformer freewheels through the VSC-converter. The transformer voltage as well as the output AC voltages are all zero.

FIG. 17e: When the desired AC output zero voltage interval has expired the commutation of the other VSC-converter phase leg is initiated. Thereby a second resonant process begins which recharges the snubber capacitors of this phase leg and brings down the transformer current. Simultaneously (or previously) the commutation of phase legs 1 and 3 of the direct converter is prepared by turning on the relevant switches of the direct converter.

FIG. 17f: The commutation of the second VSC-converter phase leg is completed and the switch that is anti-parallel to the diode that takes over the current is turned on at zero-voltage and zero-current conditions. The transformer current decreases linearly.

FIG. 17g: When $i_{tr}$ reaches the level of $i_{AC,1}$ the switches in the direct converter that were turned on in order to provide the resonance circuit turn off by natural commutation. The commutation of phase leg 1 and 3 of the direct converter begins without delay.

FIG. 17h: The commutation of phase leg 1 and 3 of the direct converter is completed and a second active voltage vector, $(N_{tr}U_d/2, N_{tr}Ud/2, -N_{tr}U_d/2)$, is applied to the ac output during a desired period of time.

FIG. 17i: Finally, the commutation of phase leg 2 of the direct converter is started.

FIG. 17j–k: When phase leg 2 of the direct converter is completed the system is principally back in the initial state and the commutation cycle can be started over again.

The commutation sequence is adapted to the operating conditions and may for certain conditions be as follows. In case the direction of the alternating voltage side currents, $i_{AC,i}$, changes during operation, for instance because the currents are of the alternating type, some alterations to the commutation cycle may be necessary. This means that the system will go to a new step in the commutation cycle without following the order described previously in such a fashion that it can proceed from the mentioned new step as described previously.

To exemplify, a few methods of achieving this are described.

In case the direction of $i_{AC,i}$ changes during step II in the commutation cycle before the commutation of phase leg i. the following procedures could be undertaken. Firstly, the commutation of phase leg i. could be omitted in the commutation cycle in question. In this case other alterations of the commutation sequence could also be made in order to minimise the impact on the PWM pattern of $u_{AC,i}$ that the exclusion of the commutation may have. Secondly, if possible, the commutation of phase leg i. in the direct converter could be carried out by hard switching, i.e. by turning off a valve that carries current by gate control. Thereby the commutation could be made to occur at the desired instant despite the change of direction of the current. In this case it should be noted that the current is likely to be small close to a direction reversal which leads to less severe stress and lower losses in the device that turns off by hard commutation.

In case the direction of $i_{AC,i}$ changes during step II in the commutation cycle after the commutation of phase leg i. the phase leg could preferably be commutated once more before the end of step II. This should preferably be made at the end of step II whereby the impact on the PWM pattern of $u_{AC,i}$ can be minimised.

In case the direct voltage side converter is equipped with two phase legs and these are commutated one at a time by nonresonant commutation and $i_{tr}$ changes direction in step I during the interval when the first of these phase legs has been commutated, due to variations in the alternating voltage side currents, the following procedure could be undertaken. The phase leg that was commutated at the beginning of the cycle is commutated again when the desired zero-voltage interval is completed and thereafter the system proceeds to step II. The timing of the subsequent commutations is properly adapted in order to minimise the impact on the PWM pattern of $u_{AC,i}$, i=1, 2, 3 and also in order to ensure proper operation of the transformer.

It is also possible to use an algorithm for predicting the zero crossings of $i_{AC,i}$ in advance and thereby be able to make appropriate changes to the commutation sequence that may take effect also prior to the zero crossings.

In case a zero crossing of $i_{AC,i}$ may occur this may be prepared for in the sense that the valves of phase leg i. in the direct converter that carry current are controlled to conduct in both directions.

The current valves of the direct converter may be equipped with appropriate snubber circuits in order to prevent overvoltages due to reverse recovery processes during the turn off of these valves. Reverse recovery in the diodes or thyristors of the direct converter may give rise to high current derivatives and by that high overvoltages. It is a general knowledge that snubber circuits may, and mostly they must, be used in this context, although it does not belong to the core of the present invention.

To conclude, the proposed converter concept combines the best properties of a direct converter with those of a voltage source converter to form a system with low component count, significantly reduced switching losses and a very attractive set of functionalities.

The invention is of course not in any way restricted to the preferred embodiments described above, but many possibilities to modifications thereof will be apparent to a person with ordinary skill in the art without departing from the basic idea of the invention as defined in the appended claims.

It is pointed out that "detecting" as used above for the current detecting means 41 and in the corresponding appended claim has to be understood also to comprise the case of indirect detection of the current through the second transformer winding. This means may very well be connected to measure the current in the first transformer winding and use the transformation ratio of the transformer for obtaining the current in the second transformer winding.

What is claimed is:

1. An apparatus for converting direct voltage into a three-phase alternating voltage and conversely comprising: a VSC-converter having a direct voltage intermediate link with a positive pole and a negative pole and at least one phase leg interconnecting the two poles and having at least two current valves connected in series, each current valve having at least one semiconductor device of turn-off type and a rectifying member connected in anti-parallel therewith, the apparatus further comprising a transformer with two opposite ends of a first winding thereof connected to an output each of the VSC-converter and with a second winding thereof connected to an arrangement adapted to form voltage pulses for forming a three-phase alternating voltage, the apparatus also comprising a unit adapted to control the VSC-converter and said arrangement for obtaining said voltage conversion, wherein the VSC-converter comprises at least one snubber capacitor connected to said current valves thereof, that said arrangement comprises a direct converter having at least three phase legs connected through the opposite ends thereof to opposite ends of said second winding of the transformer and having at least two current valves connected in series, each of these current valves being able to conduct current and block voltage in both directions and to turn on by gate control, and that the midpoints of said phase legs of the direct converter are provided with phase outputs for forming a terminal for said alternating voltage between these phase outputs.

2. An apparatus according to claim 1, wherein said current valves of the VSC-converter each comprises a said snubber capacitor connected in parallel with said semiconductor device and rectifying member.

3. An apparatus according to claim 1, wherein said VSC-converter has two said phase legs and that said outputs connected to the ends of said first transformer winding are formed by a midpoint between current valves of a phase leg each.

4. An apparatus according to claim 1, wherein the VSC-converter has one said phase leg, that one of said outputs connected to the ends of said first transformer winding is formed by a midpoint between current valves of said phase leg, and that the output connected to the opposite end of the first transformer winding is formed by a midpoint of the direct voltage intermediate link separated from both said positive and negative poles by at least one capacitor.

5. An apparatus according to claim 4, wherein the VSC-converter comprises one said snubber capacitor connected in parallel to said first transformer winding.

6. An apparatus according to claim 1, wherein said direct converter has a three-phase terminal for said alternating phase voltage.

7. An apparatus according to claim 6, wherein said direct converter has three said phase legs and that said two phase outputs forming said terminal are formed by a midpoint between the current valves of a phase leg each.

8. An apparatus according to claim 1, wherein the semiconductor device and the rectifying member of the respective valve of the VSC-converter are integrated in one and the same semiconductor device, having an inherent body diode.

9. An apparatus according to claim 1, wherein the valves of the direct converter comprise semiconductor devices adapted to turn off and thereby turn off the valve by zero-crossing of the current through the semiconductor devices.

10. An apparatus according to claim 9, wherein said current valves of the direct converter are adapted to turn off upon forcing the current through these valves down to zero as a result of events in an external circuit to which these valves are adapted to be connected.

11. An apparatus according to claim 10, wherein said current valve of the direct converter comprises two reverse-blocking controllable second valves connected in anti-parallel.

12. An apparatus according to claim 11, wherein said second valve comprises a single reverse-blocking controllable semiconductor device, e.g. a thyristor.

13. An apparatus according to claim 12, wherein said single reverse-blocking controllable semiconductor device has silicon carbide as base material.

14. An apparatus according to claim 11, wherein said second valve comprises a series connection of a semiconductor device that can be turned on by gate control and a rectifying member, such as a diode.

15. An apparatus according to claim 14, wherein interconnection points between the semiconductor device and the rectifying member in the two second valves are directly interconnected.

16. An apparatus according to claim 11, wherein said rectifying members of the valves of the direct converter are diodes based on a material having a wide energy gap between the valence band and the conduction band, i.e. a band gap exceeding 2 eV.

17. An apparatus according to claim 16, wherein said diodes are based on silicon carbide.

18. An apparatus according to claim 14, wherein said semiconductor device in each second valve is one of an insulated gate bipolar transistor (IGBT), a gate turn-off thyristor (GTO), a gate commutated thyristor (GCT), an integrated gate commutated thyristor (IGCT), a MOS controlled thyristor (MCT), a MOSFET and a JFET.

19. An apparatus according to claim 1, wherein the phase legs of the VSC-converter and/or the direct converter comprise a plurality of current valves connected in series on each side of said midpoint of the phase leg for together holding a voltage to be held in a blocking state of the phase leg part they belong to.

20. An apparatus according to claim 1, wherein the current valves of the direct converter are equipped with appropriate snubber or clamp circuits in order to prevent overvoltages due to reverse recovery processes during turn off of said valves.

21. An apparatus according to claim 1, wherein said control unit is adapted to control the semiconductor devices of the VSC-converter for changing the switching state of this converter, by changing the connection of at least one of said outputs thereof from one pole of said direct voltage intermediate link to the other while charging and discharging said snubber capacitor for lowering the voltage derivatives during turn-off of a semiconductor device.

22. An apparatus according to claim 21, wherein said control unit is adapted to turn on semiconductor devices of the current valves of the VSC-converter when a current flows through the rectifying member of the valve in question for turning the semiconductor device on at substantially zero-voltage thereacross and zero-current therethrough.

23. An apparatus according to claim 3, wherein said control unit is adapted to commutate one phase leg of the VSC-converter at a time starting from a state in which the two midpoints are connected to different poles of the direct voltage intermediate link for obtaining an intermediate state in which said midpoints are connected to the same pole for applying a zero-voltage to the first winding of the transformer.

24. An apparatus according to claim 23, wherein said control unit is adapted to varying the order in which the phase legs of the VSC-converter are commutated in such a fashion that the conduction losses of the valves of the VSC-converter are evenly distributed.

25. An apparatus according to claim 3, wherein said control unit is adapted to control the semiconductor devices of the current valves of the VSC-converter for commutating both phase legs at the same time starting from the state in which the two midpoints are connected to different poles of the direct voltage intermediate link through a conducting semiconductor device each by turning these semiconductor devices of both said valves off.

26. An apparatus according to claim 2, wherein starting from a switching state in which the midpoint of said phase leg of the VSC-converter is connected to a first pole of the direct voltage intermediate link said control unit is adapted to turn the semiconductor device of the current valve connecting the output to said first pole off for charging the snubber capacitor in parallel therewith and connecting said midpoint through the other current valve to the other, second pole of the direct voltage intermediate link for changing the sign of the voltage across said first transformer winding.

27. An apparatus according to claim 1, wherein said control unit is adapted to commutate the phase legs of the direct converter when the power flow in the apparatus is directed from the alternating voltage side to the direct voltage side, by controlling the current valves of each phase leg for changing the connection of the output thereof from one end of said second transformer winding to the other for changing the direction of the current through said second transformer winding enabling a change of the switching state of the VSC-converter.

28. An apparatus according to claim 27, wherein starting from a state in which the output of a phase leg of said direct converter is connected to a first end of the second transformer winding through a conducting first current valve said control unit is adapted to turn the other, second current valve of that phase leg on for short-circuiting the phase leg for opening a current path through the winding of the transformer in the direction of the voltage across the transformer, so that the second current valve gradually takes over the current through the transformer and the first current valve turns off as the current through it goes to zero.

29. An apparatus according to claim 21, wherein said valves of the phase legs of the VSC-converter to turn off for commutating the output of those phase legs and at the same time, starting from a state in which the output of a phase leg of the direct converter is connected to a first end of the second transformer winding through a conducting first current valve, control the other, second current valve of that phase leg to turn on for short-circuiting the second transformer winding through that phase leg for opening a current path through that winding of the transformer in the direction of the voltage across the transformer so as to form a resonance circuit by the capacitance of the snubber capacitor of the VSC-converter and the leakage inductance of the transformer making the current through the transformer increasing for assisting the commutation of said phase leg of the VSC converter by charging and discharging said snubber capacitor.

30. An apparatus according to claim 29, wherein the control unit is adapted to turn one or two semiconductor devices in the VSC-converter that are carrying current off when the current through the transformer has increased to a certain value as a consequence of the opening of said current path for initiating a resonant process recharging the snubber capacitor and by that transferring the potential of the phase terminal of the phase leg or the phase legs to an opposite direct voltage pole, and that the control unit is adapted to then after the rectifying members that initially blocked the direct voltage have taken over the current, turn the semiconductor devices being antiparallel to the latters on at zero-voltage and zero-current conditions.

31. An apparatus according to claim 29, wherein it comprises an additional inductor connected in series with said transformer for increasing the inductance of said resonance circuit.

32. An apparatus according to claim 7, wherein a midpoint of the second winding of the transformer is provided with a connection for grounding purposes.

33. An apparatus according to claim 7, wherein a midpoint of the second transformer winding is provided with a connection for connecting loads between this connection and any of the alternating voltage side phase outputs.

34. An apparatus according to claim 27, wherein said control unit is adapted to control the current valves of the direct converter for obtaining a desired pulse width modulation pattern for said alternating phase voltage on said terminal.

35. An apparatus according to claim 1, wherein said control unit is adapted to a) control the semiconductor devices of the VSC-converter for changing the switching state of this converter by changing the connection of at least one of said outputs thereof from one pole of said direct voltage intermediate link to the other for changing the sign of the voltage across said first transformer winding and b) commutate phase legs of the direct converter for changing the end of the second transformer winding to which the respective phase output is connected in such a sequence and at such delays that desired voltage pulses are obtained on said terminal and do this until the current through the second transformer winding has changed direction, and then start over with controlling the VSC-converter to change switching state again.

36. An apparatus according to claim 21, wherein the control unit is adapted to control the semiconductor devices of the VSC-converter for changing the switching state thereof and start commutating one or several phase legs of phase leg before the change of switching state of the VSC-converter has been completed, when there is a desire to avoid the state the system appears in after a commutation of the VSC-converter.

37. An apparatus according to claim 36, further comprising means for detecting the voltage across said transformer, and that the control unit is adapted to start the commutation of the direct converter based upon information from said voltage detecting means when, as a consequence of the change of switching state of the VSC-converter commenced, the voltage across the first transformer winding has changed sign and exceeded a certain threshold voltage value.

38. An apparatus according to claim 21, wherein the control unit is adapted to commutate all phase legs of the direct converter by controlling the current valves of the phase legs and start controlling the semiconductor devices of the VSC-converter for changing the switching state thereof before the commutation of all phase legs of the direct converter has been completed, when there is a desire to avoid the state the system appears in after a commutation of all of the phase legs of the direct converter.

39. An apparatus according to claim 38, further comprising means for detecting the current through one of the transformer windings, and that the control unit is adapted to start the control of the VSC-converter for changing the switching state thereof based upon information from said current detecting means when, as a consequence of the commutation of the phase leg or the phase legs of the direct converter commenced, the current through the second transformer winding has changed direction and exceeded a certain threshold current value.

40. A method for converting direct voltage into three-phase alternating voltage and conversely through an apparatus employing a VSC-converter having a direct voltage intermediate link with a positive and a negative pole and at least one phase leg interconnecting the two poles and having at least two current valves connected in series, each current valve having at least one semiconductor device of turn-off type and a rectifying member connected in anti-parallel therewith, the apparatus further comprising a transformer with two opposite ends of a first winding thereof connected to an output each of the VSC-converter and with a second winding thereof connected to an arrangement adapted to form voltage pulses for forming a threephase alternating voltage, said VSC-converter and said arrangement being controlled for obtaining said voltage conversion, wherein the control is carried out for an apparatus in which the VSC-converter has at least one snubber capacitor connected to said current valves thereof, said arrangement comprising a direct converter having at least three phase legs connected through the opposite ends thereof to opposite ends of said second winding of the transformer and having at least two current valves connected in series, each of these current valves being able to conduct current and block voltage in both directions and to turn on by gate control, and the midpoints of said phase legs of the direct converter being provided with phase outputs for forming a terminal for said alternating voltage between these phase outputs, and that the control comprises the steps of:
 a) controlling the semiconductor devices of the VSC-converter for changing the switching state of this converter by changing the connection of at least one of said outputs thereof from one pole of the direct voltage intermediate link to the other for changing the sign of the voltage across said first transformer winding,
 b) commutate the phase legs of the direct converter for changing the end of the second transformer winding to which the respective phase output is connected in such a sequence and at such delays that desired voltage pulses are obtained on said terminal and do this until the current through the second transformer winding has changed direction, and
 c) starting over with controlling the VSC-converter to change switching state again.

41. A method according to claim 40, wherein it is carried out for a said apparatus in which said current valves of the VSC-converter each comprises a said snubber capacitor connected in parallel with said semiconductor device and rectifying member.

42. A method according to claim 40, wherein it is carried out for a said apparatus in which the VSC-converter comprises one said snubber capacitor connected in parallel to said first transformer winding.

43. A method according to claim 40, in which th e VSC-converter has two phase legs and said outputs connected to the ends of said first transformer winding are formed by a midpoint between current valves of a phase leg each, and wherein the VSC-converter comprises one said snubber capacitor interconnecting said midpoints between current valves of the two phase legs.

44. A method according to claim 40, wherein the semiconductor devices in the valves of the direct converter are controlled to turn off by zero-crossing of the current through the semiconductor devices.

45. A method according to claim 40, wherein the semiconductor devices of the VSC-converter are controlled for changing the switching state of this converter by changing the connection of at least one of said outputs thereof from one pole of said direct voltage intermediate link to the other while charging and discharging said snubber capacitor for lowering the voltage derivates during turn-off of a semiconductor device.

46. A method according to claim 45, wherein the semiconductor devices of the current valves of the VSC-converter are turned on at substantially zero-voltage thereacross and zero-current therethrough when a current flows through the diode of the valve in question.

47. A method according to claim 45, in which the VSC-converter has two phase legs and said outputs connected to the ends of said first transformer winding are formed by a midpoint between current valves of a phase leg each, and wherein one phase leg of the VSC-converter is commutated at a time from a state in which the two midpoints are connected to different poles of the direct voltage intermediate link for obtaining an intermediate state in which said midpoints are connected to the same pole for applying a zero-voltage to the first winding of the transformer.

48. A method according to claim 45, in which the VSC-converter has two said phase legs and said outputs connected to the ends of said first transformer winding are formed by a midpoint between current valves of a phase leg each, and wherein the semiconductor devices of the current valves of the VSC-converter are controlled for commutating both phase legs at the same time starting from the state in which the two midpoints are connected to different poles of the direct voltage intermediate link through a conducting semiconductor device each by turning these semiconductor devices of both said valves off.

49. A method according to claim 42, wherein for the VSC-converter a control regime of commutating one phase leg at a time and a control regime of commutating both phase legs at the same time are used alternately.

50. A method according to claim 41, in which the VSC-converter has one said phase leg, one of said outputs connected to the ends of said first transformer winding is formed by a midpoint between current valves of said phase leg and the output connected to the opposite end of the first transformer winding is formed by a midpoint of the direct voltage intermediate link separated from both said positive and negative poles by at least one capacitor, and wherein starting from a switching state in which the midpoint of said phase leg of the VSC-converter is connected to a first pole of the direct voltage intermediate link the semiconductor device of the current valve connecting the output to said first pole is turned off for charging the snubber capacitor in parallel therewith and connecting said midpoint through the other current valve to the other, second pole of the direct voltage intermediate link for changing the sign of the voltage across said first transformer winding.

51. A method according to claim 40, wherein the phase legs of the direct converter are commutated by controlling the current valves of those phase legs for changing the connection of the output thereof from one end of said second transformer winding to the other for changing the direction of the current through said second transformer winding enabling a change of the switching state of the VSC-converter.

52. A method according to claim 51, wherein starting from a state in which the output of a phase leg of said direct converter is connected to a first end of the second transformer winding through a conducting first current valve, the other second current valve of that phase leg is turned on for short-circuiting the phase leg for opening a current path through the winding of the transformer in the direction of the voltage across the transformer, so that the second current valve gradually takes over the current through the transformer and the first current valve turns off as the current through it goes to zero.

53. A method according to claim 45, wherein a conducting current valve of a phase leg of the VSC converter is controlled to turn off for commutating the output of that phase leg and at the same time, starting from a state in which the output of one or several phase legs of the direct converter is connected to a first end of the second transformer winding through a conducting first current valve, the other, second current valve of said phase leg or phase legs of the direct converter is controlled to turn on for short-circuiting the second transformer winding through said phase leg or phase legs for opening a current path through that winding of the transformer in the direction of the voltage across the transformer so as to form a resonance circuit by the capacitance of the snubber capacitor of the VSC-converter and the leakage inductance of the transformer making the current through said first transformer winding increasing for assisting the commutation of said phase leg of the VSC-converter by charging and discharging said snubber capacitor.

54. A method according to claim 53, wherein one or two semiconductor devices in the VSC-converter that are carrying current are turned off when the current through the transformer has increased to a certain value as a consequence of the opening of said current path for initiating a resonant process recharging the snubber capacitor and by that transferring the potential of the phase terminal of the phase leg or the phase legs to an opposite direct voltage pole, and after the rectifying members that initially blocked the direct voltage have taken over the current the semiconductor devices being anti-parallel to the latters are turned on at zero-voltage and zero-current conditions.

55. A method according to claim 50, wherein the current valves of the direct converter are controlled for obtaining a desired pulse width modulation pattern for said alternating phase voltage on said terminal.

56. A method according to claim 45, wherein the semiconductor devices of the VSC-converter are controlled for changing the switching state thereof and it is started to commutate one or more phase legs of the direct converter by controlling a current valve of that phase leg or those phase legs before the change of switching state of the VSC-converter has been completed, when there is a desire to avoid the state the system appears in after a commutation of the VSC-converter.

57. A method according to claim 56, wherein the voltage across the transformer is detected and the commutation of the direct converter is started based upon information from said voltage detection when, as a consequence of the change of switching state of the VSC-converter commenced, the voltage across the first transformer winding has changed sign and exceeded a certain threshold voltage value.

58. A method according to claim 45, wherein all phase legs of the direct converter are commutated by controlling the current valves of the phase legs of that converter and it is started to control the semiconductor devices of the VSC-converter for changing the switching state thereof before the commutation of all phase legs of the direct converter has been completed, when there is a desire to avoid the state the system appears in after a commutation of all of the phase legs of the direct converter.

59. A method according to claim 58, wherein the current through one of the transformer windings is detected, and that it is started to control the VSC-converter for changing the switching state thereof based upon information from the current detection when, as a consequence of the commutation of the phase legs of the direct converter commenced, the current through the second transformer winding has changed direction and exceeded a certain threshold current value.

60. A method according to claim 41, wherein the order of steps carried out for obtaining commutations of phase legs according to a commutation cycle is optionally changed in case the direction of the alternating voltage side current, i.e. the current on the direct converter side of the apparatus, changes during operation of the apparatus.

61. A computer program product directly loadable into the internal memory of a digital computer, comprising software code portions for performing the steps according to claim 40 when said product is run on a computer.

62. A computer program product according to claim 61 provided at least partially through a network as the Internet.

63. A computer readable medium having a program recorded thereon including software code portions adapted to make a computer control the steps of claim 40.

* * * * *